(12) United States Patent
Okajima

(10) Patent No.: US 6,778,701 B1
(45) Date of Patent: Aug. 17, 2004

(54) FEATURE EXTRACTING DEVICE FOR PATTERN RECOGNITION

(75) Inventor: Kenji Okajima, Tokyo (JP)

(73) Assignee: NEC Corporation, Tokyo (JP)

(*) Notice: Subject to any disclaimer, the term of this patent is extended or adjusted under 35 U.S.C. 154(b) by 476 days.

(21) Appl. No.: 09/679,405

(22) Filed: Oct. 4, 2000

(30) Foreign Application Priority Data

Oct. 4, 1999 (JP) ............................................ 11-283088

(51) Int. Cl.$^7$ .............................. G06K 9/46; G06K 9/62
(52) U.S. Cl. ........................ 382/190; 382/224; 382/155
(58) Field of Search ................................ 382/190, 224, 382/225, 228, 155, 156, 154; 706/15, 16, 20

(56) References Cited

U.S. PATENT DOCUMENTS

| | | | | |
|---|---|---|---|---|
| 4,259,661 A | * | 3/1981 | Todd ............................ | 382/205 |
| 5,901,244 A | * | 5/1999 | Souma et al. ................ | 382/190 |
| 6,122,628 A | * | 9/2000 | Castelli et al. ................. | 707/5 |
| 6,636,619 B1 | * | 10/2003 | Zhang et al. ................ | 382/118 |
| 2003/0194113 A1 | * | 10/2003 | Yamaguchi et al. ......... | 382/118 |

FOREIGN PATENT DOCUMENTS

| | | |
|---|---|---|
| JP | 1-321591 | 12/1989 |
| JP | 04-256087 | 9/1992 |
| JP | 7-311846 | 11/1995 |
| JP | 10-301917 | 11/1998 |

OTHER PUBLICATIONS

Ariki et al. "Integration of Face and Speaker Recognition by Subspace Method." Proc. 13th Int. Conf. on Pattern Recognition, vol. 3, Aug. 25, 1996, pp. 456–460.*
Prakash et al. "Growing Subspace Pattern Recognition Methods and Their Neura–Network Models." IEEE Trans. on Neural Networks, vol. 8, No. 1, Jan. 1997, pp. 161–168.*
Frey et al. "Mixtures of Local Linear Subspaces for Face Recognition." Proc. IEEE Computer Society Conf. on Computer Vision and Pattern Recognition, Jun. 23, 1998, pp. 32–37.*
Ootsu, "Mathematical Studies On Feature Extraction In Pattern Recognition", Electro–Technical Laboratory Report No. 818, 1981.
"Neuro–Computer" compiled under the supervisor of Nakano Hajime, Gijutsu–Hyoron Co., Ltd., pp. 38–47, 1989.
David E. Rumelhart, et al., "Parallel Distributed Processing", MIT Press, pp. 1–15, 1986.
K.I. Diamantaras, et al., "Principal Component Neural Networks", pp. 74–97.
Dr. E. Oja, "Subspace Methods of Pattern Recognition," Research Studies Press Ltd. and John Wiley & Sons Inc., 1983, "Chapter 5, The Learning Subspace Methods," pp. 91–105.

* cited by examiner

Primary Examiner—Jon Chang
(74) Attorney, Agent, or Firm—McGinn & Gibb, PLLC

(57) ABSTRACT

In a feature extracting device for pattern recognition which is hardly affected by a pattern variation, an input pattern received by a learning pattern input/store unit is normalized by a normalizing unit and projected on a subspace group by a feature vector extracting unit, so to calculate feature vectors from each projection length, and a parameter updating unit updates basis vectors of each subspace so as to increase the ratio (variation between classes/variation within a class) as for the feature vectors, and optimizes them in a way of absorbing the pattern variation into each subspace according as the learning by the update processing progresses, thereby realizing the high ratio of the variation between classes to the variation within a class at the time of completing the learning and enabling the feature extraction more suitable for pattern recognition.

38 Claims, 7 Drawing Sheets

FEATURE EXTRACTING DEVICE FOR PATTERN RECOGNITION

BACKGROUNDS OF THE INVENTION

1. Field of the Invention

The present invention relates to a feature extracting device for calculating features in pattern recognition such as image recognition, and more particularly to a feature extracting device having a pattern learning function such as a neural network.

2. Description of the Related Art

As a method of deciding features for use in pattern recognition from a group of learning patterns, a method based on a discriminant analysis has been well known and widely used (for example, methods disclosed in Japanese Patent Publication Laid-Open (Kokai) No. Heisei 01-321591 have been known).

The discriminant analysis is a method of deciding features to be extracted so as to get the greatest difference between classes (categories) while restraining the variation of features within a class (variation within category) (for example, refer to "Mathematical Study on Feature Extraction in Pattern Recognition" written by Ootsu, Electro-Technical Laboratory Report No. 818, 1981), which method is characterized by high isolation ability among classes compared with the other feature deciding method such as a principal component analysis.

Brief description about the discriminant analysis will be made here. Assume that a group of learning patterns is given and that classes these patterns belong to are given.

In the discriminant analysis, covariance matrix within class $S_w$ and covariance matrix between classes $S_b$ are required from these learning patterns then to solve the characteristic equation $S_w^{-1} S_b \cdot f_i = \lambda_i \cdot f_i$.

A predetermined number, M of characteristic vectors $f_i$ is selected from thus required characteristic vectors in decreasing order of the characteristic value $\lambda_i$.

The feature extraction is performed by calculating the inner product $Z_i = (f_i, X)$, (i=1 to M) from an objective input pattern X, using these characteristic vectors, and the characteristic $Z_i$ is extracted.

According to the above discriminant analysis, linear feature extraction in which variation within class is small and difference between classes is large can be achieved, as is well known.

On the other hand, as a learning method of input/output relationship of a pattern using a group of learning patterns consisting of each pair of an input pattern and an output pattern, an error-back propagation learning (back propagation) using a multi-layered perceptron neural network has been known and widely used (for example, refer to "Neuro-Computer" compiled under the supervisor of Nakano Hajime, Gijutsu-Hyoron Co., Ltd., 1989, and "Parallel Distributed Processing", written by D. E. Rumelhart, MIT Press, 1986).

FIG. 7 shows the structure of a three-layered perceptron neural network. In FIG. 7, an input pattern entered into an input layer is sequentially processed through an intermediate layer and an output layer, hence to calculate the output pattern.

In the error back propagation learning, each parameter (connection weight) of each layer of a neural network is updated so to conform the output pattern to a desired output pattern as a learning pattern as well as possible.

The above point will be described in detail.

In FIG. 7, an output $H_j$ of a unit j of intermediate layer is calculated from an input pattern $I_i$, using a connection weight $W_{ji}$ and a threshold $\theta_j$, by the following expression.

$$H_j = f(U_j), \quad U_j = \sum_i W_{ji} \cdot I_i + \theta_j, \quad f(x) = 1/\{1 + \exp(-2x/u_0)\},$$

The symbol f(x) is a function called a sigmoid function. The symbol $u_0$ is a predetermined parameter.

An output $O_k$ of a unit of an output layer is calculated from the output $H_j$ of an intermediate layer unit thus calculated, by the following expression.

$$O_k = f(S_k), \quad S_k = \sum_j V_{kj} \cdot H_j + \gamma_k,$$

($V_{kj}$ is the connection weight, and $\gamma_k$ is the threshold.)

At this time, assuming that the desired output pattern is $T_k$, learning will be performed by updating each parameter (such as connection weight) (generally represented as p) according to the gradient $(-\partial E/\partial p)$ so as to reduce the error to be shown in the following expression.

$$E = \left\langle \sum_k (T_k - O_k)^2 \right\rangle$$

Here, the symbol $\langle \cdot \rangle$ indicates the mean operation as for a learning pattern. As the result, an output of the neural network approaches a desired one.

The features obtained by the above-mentioned conventional discriminant analysis, however, are defectively fragile to variation of a pattern, because of being linear features.

Although the discriminant analysis is, of course, a feature selecting method of reducing the variation of features within a class according to a pattern variation (compared with the variation between classes), naturally it cannot absorb variations such as deviation, rotation, scaling of a pattern, because the obtained features are linear.

While, since a multi-layered perceptron neural network could learn the non-linear input/output relationship, it could be tough against the above-mentioned pattern variation in principle. However, in order to make a network learn so as to absorb the pattern variation and to do the pattern recognition, extravagant learning is actually required, which is not practical.

Therefore, a method of restraining an influence of a pattern variation by pre-processing such as size normalization and alignment of an input pattern, or a method of previously extracting a feature amount decided in an experimental way and doing multi-layered perceptron learning using this feature amount as a new input, is adopted.

Namely, a multi-layered perceptron neural network also has a problem of being fragile to a pattern variation actually.

SUMMARY OF THE INVENTION

A first object of the present invention is to provide a feature extracting device suitable for pattern recognition, tough against a pattern variation, in order to solve the above conventional problem.

A second object of the present invention is to provide a feature extracting device tough against a pattern variation, with no need of extravagant learning.

According to the first aspect of the invention, a feature extracting device comprises feature vector calculating means for projecting a learning pattern to be recognized on a subspace group, so to calculate squares of projection length on each subspace as feature vectors, and subspace basis vector learning means including at least parameter updating means for updating basic vectors of each subspace forming the subspace group, so as to increase the ratio of variation between classes to variation within a class, as for each component of the feature vectors.

In the preferred construction, the feature vector calculating means normalizes the learning pattern, hence to project the same on the subspace group, and calculates squares of projection length on each subspace, or quantity derived from there, as feature vectors.

In another preferred construction, the subspace basis vector learning means includes calibrating means for calibrating the feature vectors by performing restraint processing among features based on a restraint parameter predetermined as for the calculated feature vectors.

In another preferred construction, the feature vector calculating means normalizes the learning pattern, hence to project the same on the subspace group, and calculates squares of projection length on each subspace, or quantity derived from there, as feature vectors, and the subspace basis vector learning means includes calibrating means for calibrating the feature vectors by performing restraint processing among features based on a restraint parameter predetermined as for the calculated feature vectors.

In another preferred construction, the parameter updating means performs normalized orthogonalization on the basis vectors obtained by update processing, according to the Gram-Schmid orthogonalization.

In another preferred construction, the feature vector calculating means normalizes the learning pattern, hence to project the same on the subspace group, and calculates squares of projection length on each subspace, or quantity derived from there, as feature vectors, and the parameter updating means performs normalized orthogonalization on the basis vectors obtained by update processing, according to the Gram-Schmid orthogonalization.

In another preferred construction, the feature vector calculating means normalizes the learning pattern, hence to project the same on the subspace group, and calculates squares of projection length on each subspace, or quantity derived from there, as feature vectors, the subspace basis vector learning means includes calibrating means for calibrating the feature vectors by performing restraint processing among features based on a restraint parameter predetermined as for the calculated feature vectors, and the parameter updating means performs normalized orthogonalization on the basis vectors obtained by update processing, according to the Gram-Schmid orthogonalization.

In another preferred construction, the feature vector calculating means normalizes the learning pattern, hence to project the same on the subspace group, and calculates squares of generalized projection length on each subspace as feature vectors.

In another preferred construction, the subspace basis vector learning unit performs update processing of the basis vectors for increasing the ratio of the variation between classes to the variation within a class as for the feature vectors, by updating the basis vectors so as to make the respective components of the feature vectors have no correlation to each other or make the same independent, and simultaneously so as to increase the ratio of the variation between classes to the variation within a class as for the respective components of the feature vectors.

According to the second aspect of the invention, a feature extracting device for deciding features, using data set, as learning data, consisting of input patterns, class names C the patterns belong to, and a series of subclass names $C_m$ (m=1 to n, where n is an integer 1 and more, assuming that the subclasses are hierarchically classified finer according as m becomes larger), the device formed by (n+1) stages of feature extraction layers, the first stage of feature extracting layer comprising first feature vector calculating means for projecting an input learning pattern, after having been normalized, on a first subspace group, and calculating squares of generalized projection length on each subspace, or quantity derived from there as first feature vectors, and first subspace basis vector learning means including at least first parameter updating means for updating basis vectors of each subspace forming the first subspace group, so as to increase the ratio of variation between subclasses to variation within a subclass as for the n-th subclass, namely the most segmented subclass, with respect to the first feature vectors, the k-th (k=2 to n) stage of feature extraction layer comprising k-th feature vector calculating means for projecting the (k−1)-th feature vectors calculated in the (k−1)-th stage of feature extraction layer, after having been normalized, on the k-th subspace group, and calculating squares of generalized projection length on each subspace, or quantity derived from there as the k-th feature vectors, and k-th subspace basis vector learning means including at least k-th parameter updating means for updating basis vectors of each subspace forming the k-th subspace group, so as to increase the ratio (variation between subclasses/variation within a subclass) as for the (n+1−k)-th subclass, with respect to the k-th feature vectors.

In the preferred construction, the (n+1)-th stage of feature extraction layer comprises (n+1)-th feature vector calculating means for projecting the n-th feature vectors calculated in the n-th stage of feature extraction layer, after having been normalized, on the (n+1)-th subspace group, and calculating squares of generalized projection length on each subspace, or quantity derived from there as the k-th feature vectors, and (n+1)-th subspace basis vector learning means including at least (n+1)-th parameter updating means for updating basis vectors of each subspace forming the (n+1)-th subspace group, so as to increase the ratio of variation between classes to variation within a class as for the final feature vectors.

In another preferred construction, the subspace basis vector learning means of the respective feature extraction layers include calibrating means for calibrating the feature vectors by performing restraint processing among features based on a restraint parameter predetermined as for the calculated feature vectors.

In another preferred construction, the (n+1)-th stage of feature extraction layer comprises (n+1)-th feature vector calculating means for projecting the n-th feature vectors calculated in the n-th stage of feature extraction layer, after having been normalized, on the (n+1)-th subspace group, and calculating squares of generalized projection length on each subspace, or quantity derived from there as the k-th feature vectors, and (n+1)-th subspace basis vector learning means including at least (n+1)-th parameter updating means for updating basis vectors of each subspace forming the (n+1)-th subspace group, so as to increase the ratio of variation between classes to variation within a class as for the final feature vectors, and the subspace basis vector learning means of the respective feature extraction layers include calibrating means for calibrating the feature vectors by performing restraint processing among features based on a restraint parameter predetermined as for the calculated feature vectors.

In another preferred construction, the parameter updating means performs normalized orthogonalization on the basis vectors obtained by update processing, according to the Gram-Schmid orthogonalization.

In another preferred construction, the subspace basis vector learning means of the respective feature extraction layers include calibrating means for calibrating the feature vectors by performing restraint processing among features based on a restraint parameter predetermined as for the calculated feature vectors, and the parameter updating means performs normalized orthogonalization on the basis vectors obtained by update processing, according to the Gram-Schmid orthogonalization.

In another preferred construction, the (n+1)-th stage of feature extraction layer comprises (n+1)-th feature vector calculating means for projecting the n-th feature vectors calculated in the n-th stage of feature extraction layer, after having been normalized, on the (n+1)-th subspace group, and calculating squares of generalized projection length on each subspace, or quantity derived from there as the k-th feature vectors, and (n+1)-th subspace basis vector learning means including at least (n+1)-th parameter updating means for updating basis vectors of each subspace forming the (n+1)-th subspace group, so as to increase the ratio of variation between classes to variation within a class as for the final feature vectors, the subspace basis vector learning means of the respective feature extraction layers include calibrating means for calibrating the feature vectors by performing restraint processing among features based on a restraint parameter predetermined as for the calculated feature vectors, and the parameter updating means performs normalized orthogonalization on the basis vectors obtained by update processing, according to the Gram-Schmid orthogonalization.

In another preferred construction, the feature vector calculating means of each feature extraction layer normalizes an input to the corresponding layer, projects the same on a subspace group, and calculates squares of projection length on each subspace, or quantity derived from there as feature vectors, and the parameter updating means of each feature extraction layer updates normalized orthogonal basis vectors of each subspace forming the subspace group, so as to increase the ratio of variation between subclasses to variation within a subclass, or the ratio of variation between classes to variation within a class, as for the calculated feature vectors.

In another preferred construction, the hierarchical subspace basis vector learning unit performs update processing of the basis vectors, or the normalized orthogonal basis vectors increasing the ratio of the variation between classes to the variation within a class, or the ratio of the variation between subclasses to the variation within a subclass, as for the feature vectors, by updating the basis vectors, or the normalized orthogonal basis vectors so as to make the respective components of the feature vectors have no correlation to each other or make the same independent, and simultaneously so as to increase the ratio of the variation between classes to the variation within a class, or the ratio of the variation between subclasses to the variation within a subclass, as for the respective components of the feature vectors.

In another preferred construction, the (n+1)-th stage of feature extraction layer comprises (n+1)-th feature vector calculating means for projecting the n-th feature vectors calculated in the n-th stage of feature extraction layer, after having been normalized, on the (n+1)-th subspace group, and calculating squares of generalized projection length on each subspace, or quantity derived from there as the k-th feature vectors, and (n+1)-th subspace basis vector learning means including at least (n+1)-th parameter updating means for updating basis vectors of each subspace forming the (n+1)-th subspace group, so as to increase the ratio of variation between classes to variation within a class as for the final feature vectors, and the hierarchical subspace basis vector learning unit performs update processing of the basis vectors, or the normalized orthogonal basis vectors increasing the ratio of the variation between classes to the variation within a class, or the ratio of the variation between subclasses to the variation within a subclass, as for the feature vectors, by updating the basis vectors, or the normalized orthogonal basis vectors so as to make the respective components of the feature vectors have no correlation to each other or make the same independent, and simultaneously so as to increase the ratio of the variation between classes to the variation within a class, or the ratio of the variation between subclasses to the variation within a subclass, as for the respective components of the feature vectors.

According to the third aspect of the invention, a feature extracting device having n (n is an integer more than 1) stages of feature extraction layers and hierarchical subspace basis vector learning means for updating each parameter for describing operations of the respective feature extraction layers, in which the first stage of feature extracting layer comprises
  first feature vector calculating means for projecting an input pattern, after having been normalized, on a first subspace group, and calculating squares of generalized projection length on each subspace, or quantity derived from there as first feature vectors,
the k-th (k=2 to n) stage of feature extraction layer comprises
  k-th feature vector calculating means for projecting the (k−1)-th feature vectors calculated in the (k−1)-th stage of feature extraction layer, after having been normalized, on the k-th subspace group, and calculating squares of generalized projection length on each subspace, or quantity derived from there as the k-th feature vectors, and
  the hierarchical subspace basis vector learning means includes means for updating the basis vectors of each subspace forming the subspace group of the respective feature extraction layers, so as to increase the ratio of variation between classes to the variation within a class as for the n-th feature vectors that are the final feature vectors calculated in the n-th stage of feature extraction layer.

In the preferred construction, the hierarchical subspace basis vector learning means
  updates the normalized orthogonal basis vectors of each subspace forming the subspace group of the respective feature extraction layers, so as to increase the ratio of the variation between classes to the variation within a class as for the final feature vectors.

In another preferred construction, the subspace basis vector learning means of the respective feature extraction layers
  include calibrating means for calibrating the feature vectors by performing restraint processing among features based on a restraint parameter predetermined as for the calculated feature vectors.

In another preferred construction, the hierarchical subspace basis vector learning means
  updates the normalized orthogonal basis vectors of each subspace forming the subspace group of the respective feature extraction layers, so as to increase the ratio of the variation between classes to the variation within a class as for the final feature vectors, and
  the subspace basis vector learning means of the respective feature extraction layers
  include calibrating means for calibrating the feature vectors by performing restraint processing among features based on a restraint parameter predetermined as for the calculated feature vectors.

In another preferred construction, the parameter updating means
  performs normalized orthogonalization on the basis vectors obtained by update processing, according to the Gram-Schmid orthogonalization.

In another preferred construction, the hierarchical subspace basis vector learning means
  updates the normalized orthogonal basis vectors of each subspace forming the subspace group of the respective feature extraction layers, so as to increase the ratio of the variation between classes to the variation within a class as for the final feature vectors, and
  the parameter updating means
  performs normalized orthogonalization on the basis vectors obtained by update processing, according to the Gram-Schmid orthogonalization.

In another preferred construction, the hierarchical subspace basis vector learning means
  updates the normalized orthogonal basis vectors of each subspace forming the subspace group of the respective feature extraction layers, so as to increase the ratio of the variation between classes to the variation within a class as for the final feature vectors,
  the subspace basis vector learning means of the respective feature extraction layers
  include calibrating means for calibrating the feature vectors by performing restraint processing among features based on a restraint parameter predetermined as for the calculated feature vectors, and
  the parameter updating means
  performs normalized orthogonalization on the basis vectors obtained by update processing, according to the Gram-Schmid orthogonalization.

In another preferred construction, the hierarchical subspace basis vector learning unit
  performs update processing of the basis vectors, or the normalized orthogonal basis vectors increasing the ratio of the variation between classes to the variation within a class, or the ratio of the variation between subclasses to the variation within a subclass, as for the feature vectors, by updating the basis vectors, or the normalized orthogonal basis vectors so as to make the respective components of the feature vectors have no correlation to each other or make the same independent, and simultaneously so as to increase the ratio of the variation between classes to the variation within a class, or the ratio of the variation between subclasses to the variation within a subclass, as for the respective components of the feature vectors.

In another preferred construction, the hierarchical subspace basis vector learning means
  updates the normalized orthogonal basis vectors of each subspace forming the subspace group of the respective feature extraction layers so as to increase the ratio of the variation between classes to the variation within a class as for the final feature vectors, and
  the hierarchical subspace basis vector learning unit
  performs update processing of the basis vectors, or the normalized orthogonal basis vectors increasing the ratio of the variation between classes to the variation within a class, or the ratio of the variation between subclasses to the variation within a subclass, as for the feature vectors, by updating the basis vectors, or the normalized orthogonal basis vectors so as to make the respective components of the feature vectors have no correlation to each other or make the same independent, and simultaneously so as to increase the ratio of the variation between classes to the variation within a class, or the ratio of the variation between subclasses to the variation within a subclass, as for the respective components of the feature vectors.

In another preferred construction, the subspace basis vector learning means of the respective feature extraction layers
  include calibrating means for calibrating the feature vectors by performing restraint processing among features based on a restraint parameter predetermined as for the calculated feature vectors, and
  the hierarchical subspace basis vector learning unit
  performs update processing of the basis vectors, or the normalized orthogonal basis vectors increasing the ratio of the variation between classes to the variation within a class, or the ratio of the variation between subclasses to the variation within a subclass, as for the feature vectors, by updating the basis vectors, or the normalized orthogonal basis vectors so as to make the respective components of the feature vectors have no correlation to each other or make the same independent, and simultaneously so as to increase the ratio of the variation between classes to the variation within a class, or the ratio of the variation between subclasses to the variation within a subclass, as for the respective components of the feature vectors.

In another preferred construction, the hierarchical subspace basis vector learning means
updates the normalized orthogonal basis vectors of each subspace forming the subspace group of the respective feature extraction layers, so as to increase the ratio of the variation between classes to the variation within a class as for the final feature vectors,
the subspace basis vector learning means of the respective feature extraction layers
include calibrating means for calibrating the feature vectors by performing restraint processing among features based on a restraint parameter predetermined as for the calculated feature vectors, and
the hierarchical subspace basis vector learning unit
performs update processing of the basis vectors, or the normalized orthogonal basis vectors increasing the ratio of the variation between classes to the variation within a class, or the ratio of the variation between subclasses to the variation within a subclass, as for the feature vectors, by updating the basis vectors, or the normalized orthogonal basis vectors so as to make the respective components of the feature vectors have no correlation to each other or make the same independent, and simultaneously so as to increase the ratio of the variation between classes to the variation within a class, or the ratio of the variation between subclasses to the variation within a subclass, as for the respective components of the feature vectors.

According to another aspect of the invention, a pattern learning device for learning relationship between input/output, using learning data set consisting of each pair of an input vector and a desired output vector corresponding to the input vector, comprising:
n stages (n is an integer 1 and more) of processing layers; and
parameter updating means for updating each parameter for describing operations of the respective processing layers,
the first stage of processing layer comprising first output calculating means for projecting an input vector, after having been normalized, on a first subspace group, and calculating squares of generalized projection length on each subspace, or quantity derived from there as first output vectors,
the k-th (k=2 to n) stage of processing layer, when n is 2 and more, comprising
k-th output calculating means for projecting the (k−1)-th output vectors calculated in the (k−1)-th stage of processing layer, after having been normalized, on the k-th subspace group, and calculating squares of generalized projection length on each subspace, or quantity derived from there as the k-th output vectors, and
the parameter updating means including a means for updating the basis vectors of each subspace of the respective processing layers, so as to decrease the average square error of the n-th output vectors calculated in the n-th stage of processing layer, that are the final output vectors, and desired output vectors corresponding to the input vector.

According to another aspect of the invention, a computer readable memory storing a feature extraction program for extracting features for pattern recognition, controlling a computer,
the feature extraction program comprising
a function of projecting a learning pattern to be recognized on a subspace group, so to calculate squares of projection length on each subspace as feature vectors, and
a function of updating basis vectors of each subspace forming the subspace group, so as to increase the ratio of variation between classes to variation within a class, as for each component of the feature vectors.

According to a further aspect of the invention, a computer readable memory storing a feature extraction program for deciding features, using data set, as learning data, consisting of input patterns, class names C the patterns belong to, and a series of subclass names $C_m$ (m=1 to n, where n is an integer 1 and more, assuming that the subclasses are hierarchically classified finer according as m becomes larger),
the feature extraction program
formed by (n+1) stages of feature extraction layers,
the first stage of feature extracting layer comprising
a first feature vector calculating function for projecting an input learning pattern, after having been normalized, on a first subspace group, and calculating squares of generalized projection length on each subspace, or quantity derived from there as first feature vectors, and
a first subspace basis vector learning function including at least first parameter updating means for updating basis vectors of each subspace forming the first subspace group, so as to increase the ratio of variation between subclasses to variation within a subclass as for the n-th subclass, namely the most segmented subclass, with respect to the first feature vectors,
the k-th (k=2 to n) stage of feature extraction layer comprising
a k-th feature vector calculating function for projecting the (k−1)-th feature vectors calculated in the (k−1)-th stage of feature extraction layer, after having been normalized, on the k-th subspace group, and calculating squares of generalized projection length on each subspace, or quantity derived from there as the k-th feature vectors, and
a k-th subspace basis vector learning function including at least k-th parameter updating means for updating basis vectors of each subspace forming the k-th subspace group, so as to increase the ratio (variation between subclasses/variation within a subclass) as for the (n+1−k)-th subclass, with respect to the k-th feature vectors.

According to a further aspect of the invention, a computer readable memory storing a feature extraction program for realizing n (n is an integer more than 1) stages of feature extraction layers and a hierarchical subspace basis vector learning function for updating each parameter for describing operations of the respective feature extraction layers, the feature extraction program including, in a first stage of feature extracting layer, a first feature vector calculating function for projecting an input pattern, after having been normalized, on a first subspace group, and calculating squares of generalized projection length on each subspace, or quantity derived from there as first feature vectors, and in the k-th (k=2 to n) stage of feature extraction layer, a k-th feature vector calculating function for projecting the (k−1)-th feature vectors calculated in the (k−1)-th stage of feature extraction layer, after having been normalized, on the k-th subspace group, and calculating squares of generalized projection length on each subspace, or quantity derived from there as the k-th feature vectors, and the hierarchical subspace basis vector learning function updating the basis vectors of each subspace forming the subspace groups of the respective feature extraction layers, so as to increase the ratio of the variation between classes to the variation within a class as for the n-th feature vectors that are the final feature vectors calculated in the n-th stage of feature extraction layer.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
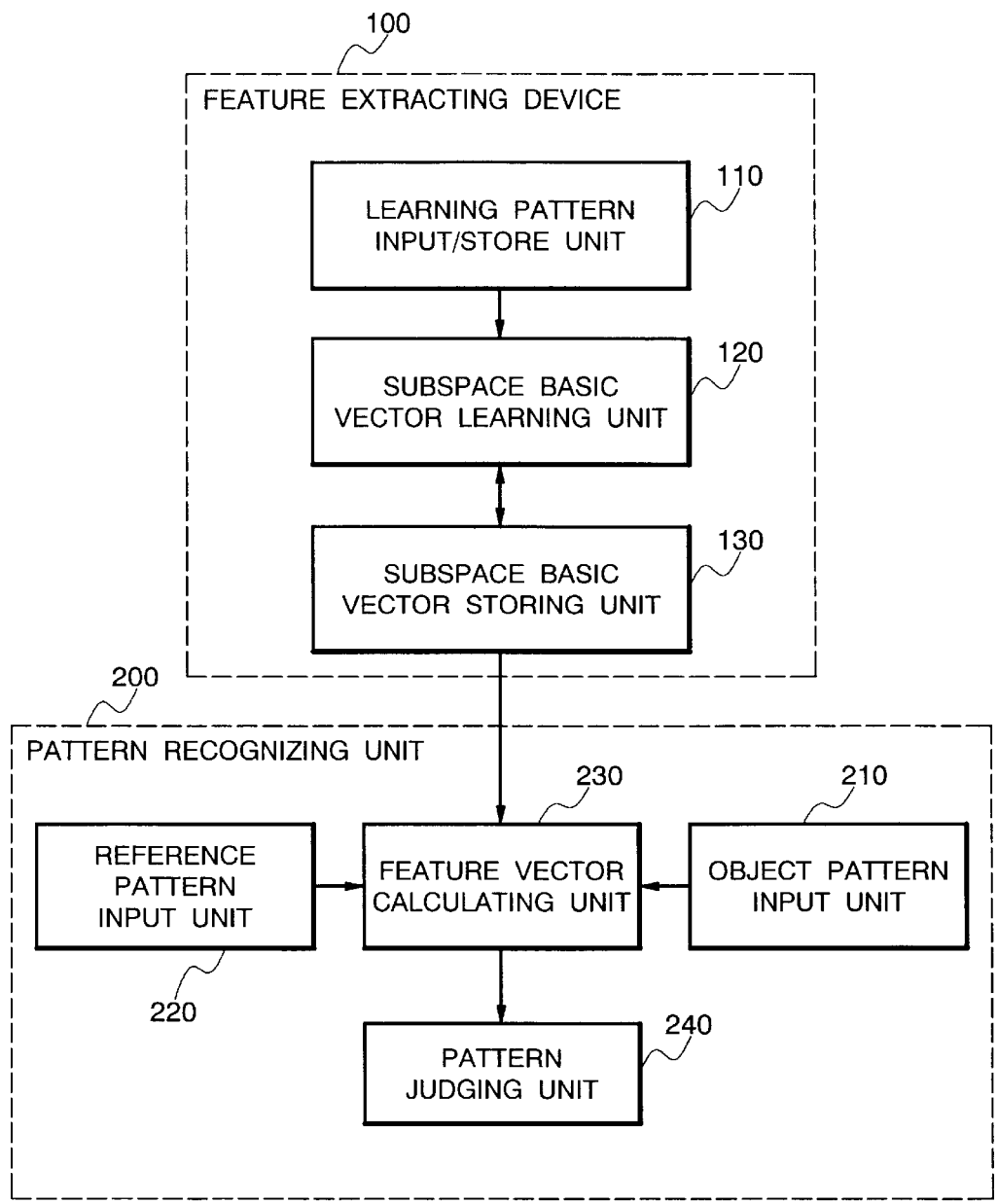
FIG. 1 is a block diagram showing the structure of a feature extracting device and a pattern recognizing device according to a first embodiment of the present invention.

FIG. 1 is a block diagram showing a feature extracting device according to a first embodiment of the present invention.

FIG. 1 shows a feature extracting device 100 of the present invention and a pattern recognizing device 200 for performing pattern recognition based on the output result.

The feature extracting device 100 of the present invention comprises a learning pattern input/store unit 110 for receiving and storing learning patterns and classes (categories) which the learning patterns belong to, a subspace basis vector learning unit 120 for deciding each basis vector of a subspace group for use in feature extraction by learning, and a subspace basis vector storing unit 130 for storing the subspace basis vector decided by the learning.

The subspace basis vector learning unit 120 further includes an initializing unit 121 for performing initial setting of a subspace group for use in feature extraction, a normalizing unit 122 for normalizing learning patterns, a feature vector extracting unit 123 for projecting the normalized learning patterns to each subspace and extracting features by calculating the square of a projected vector, a feature vector calibrating unit 124 for performing restraint processing of features on the calculated feature vectors and calibrating the feature vector, a parameter storing unit 125 for storing various parameters including a feature restraint parameter, the dispersion within a class, the average of a class, the dispersion, the average of feature vectors, and the like, a parameter updating unit 126 for updating various parameters and basis vectors of each subspace, and a completion judging unit 127 for judging completion of learning.

The pattern recognizing unit 200 further includes an object pattern input unit 210 for receiving a pattern to be recognized, a reference pattern input unit 220 for receiving a reference pattern which an object pattern is compared with, a feature vector calculating unit 123 for reading out subspace basis vectors learned by the feature extracting device 100 of the present invention and stored in the subspace basis vector storing unit 130, projecting an object pattern and a reference pattern after having been normalized, on a subspace group specified by the same vectors, and calculating the respective feature vectors, and a pattern judging unit 124 for selecting a reference pattern at the shortest distance from the object pattern by comparison of thus obtained feature vectors.

This time, the operation of the first embodiment will be described with reference to FIG. 1.

At first, the initializing unit 121 initializes a basis vector of each subspace and various parameters, before starting the learning.

Random initial values by random numbers are given to the respective components $W_{j,k,i}$ of the respective subspace basis vectors stored in the subspace basis vector storing unit 130, and the respective basis vectors are made normalized-orthogonal in every subspace by the Gram-Schmid orthogonalization.

The initializing unit 121 sets the respective parameters of the average $<C_j>$, the average within a class $<C_{j(p)}>$, the dispersion over classes $\sigma^2_{j,B}$, and the dispersion within class $\sigma^2_{j,W}$, at the predetermined initial values, and sends the same to the parameter storing unit 125.

The initializing unit 121 initializes all the values of the restraint parameters $V_{i,j}$ at zero and sends the same to parameter storing unit 125.

The learning pattern input/store unit 110 receives and stores a learning pattern $I_{p0i}$ ($1 \leq i \leq N$, where N is the number of order of a pattern) and the class p which the pattern belongs to, and they are sent to the subspace basis vector learning unit 120.

The learning pattern $I_{p0i}$ sent to the subspace basis vector learning unit 120 is normalized by the normalizing unit 122 as follows.

$$I_{pi} = I_{p0i} \Big/ \sqrt{\sum_i I_{p0i}^2}\ ,$$

The normalized learning pattern $I_{pi}$ is projected on the subspace group by the feature vector extracting unit 123, so to calculate the feature vector thereof.

Namely, the feature vector extracting unit 123 reads out the basis vectors $W_{j,k}$ stored in the subspace basis vector storing unit 130, and projects the respective learning patterns on a plurality (the number M) of subspaces specified by them, so to calculate the feature vector $C'_j$ by calculating the square of the projected vector.

Here, although each subspace is generally a space formed by a plurality of basis vectors, each subspace is formed by two basis vectors in this embodiment.

The above-mentioned feature vector calculation processing will be represented by the following expression.

$$S_{j,k} = \sum_{i=1,N} W_{j,k,i} \cdot I_{pi}$$

$$C'_j = \sum_{k=1,2} S_{j,k}^2, (1 \leq j \leq M)$$

Here, the symbol $C'_j$ represents the j-component of the extracted feature vector.

This corresponds to the projection length of the projected vector on the j-th subspace.

The symbol $W_{j,k,i}$ represents the i component of the k-th basis vector $W_{j,k}$ for forming the j-th subspace.

The symbol $S_{j,k}$ represents the inner product of the learning pattern $I_{pi}$ and the k-component of the projected vector obtained by projecting the learning pattern on the j-th subspace, namely the k-th basis vector for forming the j-th subspace.

The present invention, compared with the conventional discriminant analysis, is characterized in that the feature vector extracting unit 123 projects a pattern on a subspace and calculates the square of the projection length so to extract the feature vector.

This structure enables a decrease in variation of features within a class caused by various pattern variations such as positional deviation, rotation, and deformation, thereby realizing the feature extraction tough against a pattern variation.

The description as for this point will be further made.

As a method for deciding which class (category) an input vector belongs to, a method for, with each reference vector representing each class prepared, performing recognition based on a distance between the input vector and each reference vector, is well known.

This method, however, is defective in being fragile to a pattern variation because each class is represented by one reference vector (one point).

Therefore, as a method of realizing a discriminant function capable of obtaining high discrimination ability even if there is a pattern variation, a method of representing each class by a subspace formed by a plurality of basis vectors so to perform pattern recognition, or the subspace method is proposed (for example, refer to "Pattern Recognition and Subspace Method" written by Elukki Oya, Sangyo Tosho, 1986).

The case where positional deviation occurs to the input pattern I (x) will be considered as a simple example.

In this case, considering the square of projection length on a subspace formed by two basis vectors, $W_1(x) = \sin(kx)$, $W_2(X) = \cos(kx)$ being selected (the following expression 6), this becomes Fourier converted power spectrum of the input pattern I(x), which is a stable amount as for the positional deviation, as well known.

$$\left(\sum_x I(x)\sin(kx)\right)^2 + \sum_x (I(x)\cos(kx))^2$$

Making use of characteristics of this subspace, specifically such characteristics that even if a variation occurs to a pattern, if the basis vectors for a subspace are properly selected correspondingly to the variation, so much variation doesn't occur to a projection length of the pattern on the subspace, the present invention adopts the characteristics to the feature extraction, thereby realizing a high ratio (variation between classes/variation within a class) while restraining the variation within a class as for the extracted feature.

As the result, this enables the feature extraction tough against a pattern variation and suitable for pattern recognition.

This time, the feature vector calibrating unit 124 reads out the restraint parameter $V_{jl}$ stored in the parameter storing unit 125 and performs the calibration processing as shown in the following expression on $C'_j$ calculated by the feature vector extracting unit 123.

$$C_j = C'_j - \sum_{l<j} V_{jl} C'_l, (1 \leq j \leq M)$$

Namely, the output $C'_j$ of the subspace No. j is restrained by the weight $V_{jl}$ from the output of the subspace No. l having the smaller number than that.

This restraint processing is effective in preventing from overlapped extraction of the same feature as the feature already extracted.

If updating parameters according to the parameter updating processing described later, learning will progress in a way of finding no correlation between each extracted feature.

The parameter updating unit 126 updates the basis vectors of each subspace so as to increase the ratio between the variation between classes and the variation within a class as for each component $C_j$ of thus obtained feature vector.

Namely, assuming that the variation between classes as for the component $C_j$ of the feature vector is defined as $\sigma^2_{j,B}$ and the variation within a class is defined as $\sigma^2_{j,W}$, each basis vector is updated in the direction of increasing T along the gradient $(\partial T/\partial W_{j,k,i})$ so as to increase the value of an estimate function, with $T=\Sigma_j(\sigma^2_{j,B}/\sigma^2_{j,W})$ defined as the estimate function.

This processing develops learning of the feature having a 10 high ratio (variation between classes/variation within a class), in other words, suitable for pattern recognition.

More concretely, each basis vector will be updated according to the following expression obtained from this differentiation.

Namely, when the learning pattern $I_{pi}$ belonging to the class p is supplied, each basis vector will be updated according to the following expression.

$$W_{j,k,i} \leftarrow W_{j,k,i} + \Delta W_{j,k,i}$$

$$\Delta W_{j,k,i} = \varepsilon[(<C_j(p)> - <C_j>) \cdot S_{j,k} \cdot I_{pi} / \sigma^2_{j,W} -$$
$$(C_j - <C_j(p)>) \cdot S_{j,k} \cdot I_{pi} \cdot \sigma^2_{j,B} / \sigma^4_{j,W} -$$
$$\left\{\sum_{l>j}(<C_l(p)> - <C_l>) \cdot V_{l,j} / \sigma^2_{l,W}\right\} S_{j,k} \cdot I_{pi} +$$
$$\left\{\sum_{l>j}(C_l - <C_l(p)>) \cdot V_{l,j} \cdot \sigma^2_{j,B} / \sigma^4_{l,W}\right\} S_{j,k} \cdot I_{pi}]$$

$$(1 \leq i \leq N, 1 \leq k \leq 2, 1 \leq j \leq M)$$

Where, the symbol $\varepsilon$ is a predetermined positive parameter for deciding the learning rate, the symbol $<C_j>$ is the parameter showing the average value of the feature $C_j$, the symbol $<C_{j(p)}>$ is the parameter showing the average value of the feature $C_j$ when the learning pattern belonging to the class p is supplied, the symbol $\sigma^2_{j,B}$ is the parameter showing the dispersion over classes of the feature $C_j$, the symbol $\sigma^2_{j,W}$ is the parameter showing the dispersion within a class of the feature $C_j$, and these parameters are read out from the parameter storing unit 125.

The symbol $C_j$ indicates the feature value corresponding to the current input pattern $I_{pi}$, the symbol $S_{j,k}$ indicates the inner product of the learning pattern $I_{pi}$ and the k-th basis vector of the subspace No. j appearing in the expression (5), and these values are received from the feature vector extracting unit 123.

In this update rule, though the third term and the fourth term show a term depending on the restraint parameter $V_{l,j}$, the effect of the restraint has been already reflected by the value of the feature $C_j$, and therefore, these terms can be omitted.

The update rule in which these terms are omitted is used in this embodiment.

When these terms are taken into the update rule, the restraint parameter $V_{l,j}$ is read out from the parameter storing unit 125.

Since the basis vectors obtained by the above updating processing are not necessarily normalized-orthogonal, the parameter updating unit 126 performs the normalized orthogonalization on each updated basis vector by the Gram-Schmid orthogonalization.

The parameter updating unit 126 performs the processing as shown in the following expression and updates each parameter of the average $<C_j>$, the average within a class $<C_{j(p)}>$, the dispersion over classes $\sigma^2_{j,B}$, and the dispersion within a class $\sigma^2_{j,W}$ stored in the parameter storing unit 125.

$$<C_j> \leftarrow <C_j>(1-\varepsilon_1)+\varepsilon_1 C_j$$

$$<C_j(p)> \leftarrow (1-\varepsilon_2)<C_j(p)>+\varepsilon_2 C_j$$

$$\sigma_{j,W}^2 \leftarrow (1-\varepsilon_3)\sigma_{j,W}^2+\varepsilon_3(C_j-<C_j(p)>)^2$$

$$\sigma_{j,T}^2 \leftarrow (1-\varepsilon_4)\sigma_{j,T}^2+\varepsilon_4(C_j-<C_j>)^2$$

$$\sigma_{j,B}^2=\sigma_{j,T}^2-\sigma_{j,W}^2, (1 \leq j \leq M)$$

Where, the symbols $\varepsilon_1$ to $\varepsilon_4$ are positive constants much smaller than 1, which have been previously determined.

Further, the symbol p indicates the class the current learning pattern belongs to.

The parameter updating unit 126 further updates the restraint parameter $V_{i,j}$ stored in the parameter storing unit 125 according to the following expression.

$$V_{i,j} \leftarrow V_{i,j}+\Delta V_{i,j}=V_{i,j}+\varepsilon_5(C_i-<C_i>)(C_j-<C_j>), (2 \leq i \leq M, j<i)$$

Where, the symbol $\varepsilon_5$ is a positive constant much smaller than 1, which has been previously determined.

In the case of convergence of this update rule, $(C_i-<C_i>)(C_j-<C_j>)=0$ is obtained from $\Delta V_{i,j}=0$, showing that the learning progresses so as to have no correlation between each feature.

This is effective in preventing from overlapped extraction of the already-extracted feature (for example, refer to "Principal Component Neural Networks" pp 85–86, written by K. I. Diamantaras and S. Y. Kung, John Wiley & Sons, 1996).

Although, in the expression (10), the correction term $\varepsilon_5$ $(C_i-<C_i>)(C_j-<C_j>)$ in proportion to the correlation is used, the term in proportion to the correlation at higher level, for example, $\varepsilon_5$ $(C_i-<C_i>)^2(C_j-<C_j>)^2$ may be used as the correction term.

In the case of this update rule, learning progresses so that each feature should be independent mutually.

At the time of completing the above processing, the learning pattern input/store unit 110 receives the next learning pattern, and repeats the same processing.

The completion judging unit 127 judges whether the learning has been performed Nmax times, predetermined times, on all the learning patterns, and when this condition is satisfied, it completes the learning.

Or, the completion judging unit 127 may be designed to examine a change of the ratio (variation between classes/variation within a class) and then complete the learning when the increase becomes smaller than the predetermined value.

The pattern recognizing device 200 performs pattern recognition, using subspaces learned by the feature extracting device 100.

The feature vector calculating unit 123 normalizes the pattern $I_{0i}$ to be recognized, which is supplied from the object pattern input unit 210, projects the same on a subspace group specified by each basis vector stored in the subspace basis vector storing unit 130, and calculates the feature vector $C=(C_1, C_2, \ldots, C_M)$.

Specifically, the following processing will be performed.

$$I_i = I_{0i} \Big/ \sqrt{\sum_i I_{0i}^2},$$

$$C_j = \sum_{k=1,2} \left( \sum_i W_{j,k,i} \cdot I_i \right)^2, (1 \le j \le M)$$

The feature vector calculating unit 113 similarly normalizes the reference pattern $I_{p,i}$ supplied from the reference pattern input unit 112, projects the same on a subspace group and calculates the feature vector $C_p = (C_{p1}, C_{p2}, \ldots, C_{pM})$.

The pattern judging unit 124 reads out the dispersion within a class $\sigma^2_{j,W}$ from the parameter storing unit 125, calculates the distance dp between the feature vectors according to the following expression, and the class which is represented by a reference pattern having the shortest distance is supplied as the judging result.

$$d_p = \sum_j (C_j - C_{pj})^2 / \sigma^2_{jW}$$

Although this embodiment is designed to normalize an input pattern according to the processing of the expression (4), it may be designed to normalize the feature vector obtained by the expression (7) instead.

$$C_j \leftarrow C_j \Big/ \left( \sum_i C_i + s \right),$$

Where, the symbol s is a predetermined small positive constant.

Although this embodiment is designed to develop the learning so as to find no correlation between each component of the feature vectors, or enlarge the ratio (variation between classes/variation within a class) of each component, this may be replaced with a learning rule such as increasing an estimate function, with the ratio (variation between classes/variation within a class) of the feature vector represented by the following expression as the estimate function.

T=det (SB)/det (SW)

Where, the symbol det ($S_B$) is a determinant of the covariance matrix between classes $S_B$ of the feature vector C, and the symbol det ($S_W$) is a determinant of the covariance matrix within a class $S_W$ of the feature vector C.

In this case, the update processing of each basis vector represented by the expression (8) will be performed so as to increase T' along the gradient ($\partial T'/\partial W_{j,k,i}$), according to the following expression.

$$W_{j,k,i} \leftarrow W_{j,k,i} + \epsilon \partial T'/\partial W_{j,k,i}$$

This case needs neither correction processing by the restraint between feature components represented by the expression (7) nor update processing of the restraint parameter represented by the expression (10).

In the case of linear determinant analysis, when the respective components of the feature vectors have no correlation to each other and the ratio (variation between classes/variation within a class) of each component is maximized, it is known that the obtained feature vectors prove to be such feature vectors as maximizing the ratio T' (variation between classes/variation within a class) of the expression (15).

This time, the second embodiment of the present invention will be described.

Though the second embodiment has substantially the same structure as that of the first embodiment and does the same operation, only the following point is different.

Namely, in the second embodiment, after the parameter updating unit 126 updates each basis vector according to the rule as shown in the expression (8), the normalization will be performed according to the following expression.

$$W_{j,k,i} \leftarrow W_{j,k,i} \Big/ \sqrt{\sum_{k',i'} W^2_{j,k',i'}}$$

However, the Gram-Schmid orthogonalization will not be performed thereafter, differently from the first embodiment.

In the other points, the structure and the operation of the second embodiment are completely the same as those of the first embodiment.

In the second embodiment, since the normalized orthogonalization is not performed, two basis vectors specifying each subspace don't necessarily form a normalized orthogonal base.

Therefore, the quantity obtained by the processing as shown in the expression (5) or the expression (12) does not necessarily become the projection length of a projected vector on a subspace in the second embodiment, but what is called, "generalized projection length" can be obtained. Taking this point into consideration, the completely same processing as that of the first embodiment is performed on the other points in the second embodiment.

In this specification, the square root of a right side of the expression (5) calculated by using the non-normalized orthogonal vector $W_{j,k}$ is to be called as "generalized projection length".

The difference between the first embodiment and the second embodiment will be described here.

Figure 9:
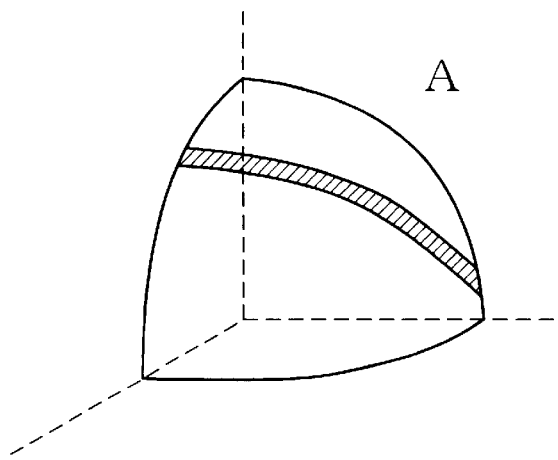
FIG. 9 is a view showing an example of the range of unit vectors ranging within a constant variation range from the maximum value with respect to the projection length, on a super spherical surface formed by the unit vectors.
Figure 10:
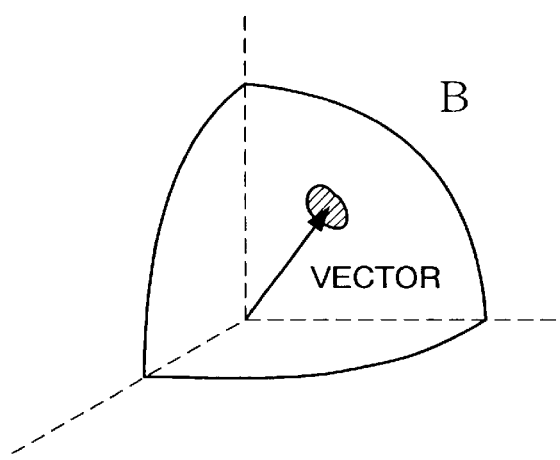
FIG. 10 is a view showing an example of an area formed by unit vectors X ranging within a constant variation range from the maximum with respect to the inner product (p,X) of a unit vector p and itself, on a super spherical surface formed by the unit vectors.
Figure 11:
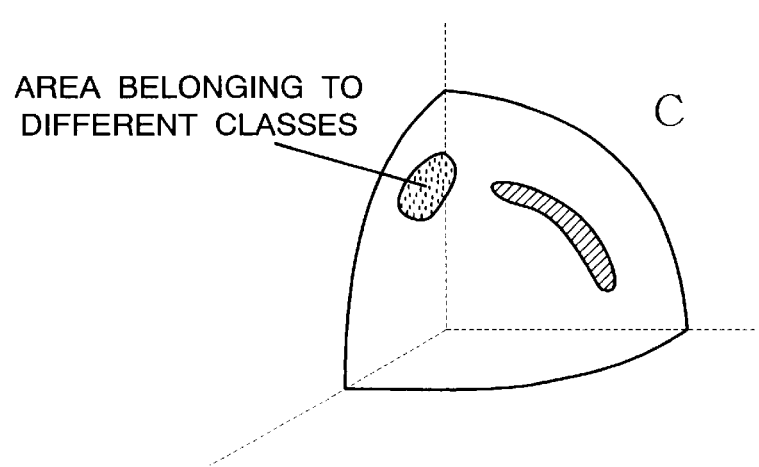
FIG. 11 is a view showing an example in the case where the unit vectors belonging to different classes are distributed within the range of the unit vectors shown in FIG. 10.

FIGS. 9, 10, and 11 show the super spherical surface formed by the input vector X in which the norm is normalized.

Here, taking a three-dimensional input vector for instance for brief description, this super spherical surface is represented by the ordinal spherical surface.

In FIGS. 9, 10, and 11, considering projection length of an input vector on a specified subspace (plane), the input vectors maximizing the projection length are distributed on a circle obtained as an intersectional portion of the spherical surface and the subspace (plane).

Therefore, input vectors with the projection length is 20 within a predetermined variation range from the maximum value are distributed within a band as shown by a sloped line in FIG. 9.

Considering the case of taking the inner product, (p,X) of the input vector X and a single vector p, the area within the predetermined variation range from the maximum becomes a circle (FIG. 10) having the center p.

Therefore, in the subspace method, if setting the direction of a band in FIG. 9 to the direction of the variation of an input vector accompanying the pattern variation, feature extraction tough against a pattern variation is possible.

This is why the feature extraction tough against a pattern variation can be achieved in the first embodiment.

There may occur some cases where input vectors belonging to different classes may be distributed also within the band of FIG. 9 (FIG. 11).

If such a thing occurs, since this functions in the direction of decreasing the variation between classes as for features, it is not preferable as a feature for use in the pattern recognition.

In the second embodiment, since "generalized projection length" is calculated as features, the area where the feature value ranges within the predetermined range from the maximum value does not become the above-mentioned band generally but the area of finite length which is cut at a specified distance (FIG. 10).

This is the difference in the operation between the first embodiment and the second embodiment.

In the second embodiment, since the above area is set, in the learning, so as to eliminate the other classes while restraining the variation within a class caused by a pattern variation, it is possible to extract features more suitable for the pattern recognition.

In the embodiment, although only the normalization represented by the expression (17) is performed, it may be designed to perform the orthogonalization on each basis vector, before this normalization.

In this case, although the respective basis vectors are not necessarily normalized-orthogonal to each other, they are orthogonal set and the sum of the squares thereof is normalized to 1.

Figure 2:
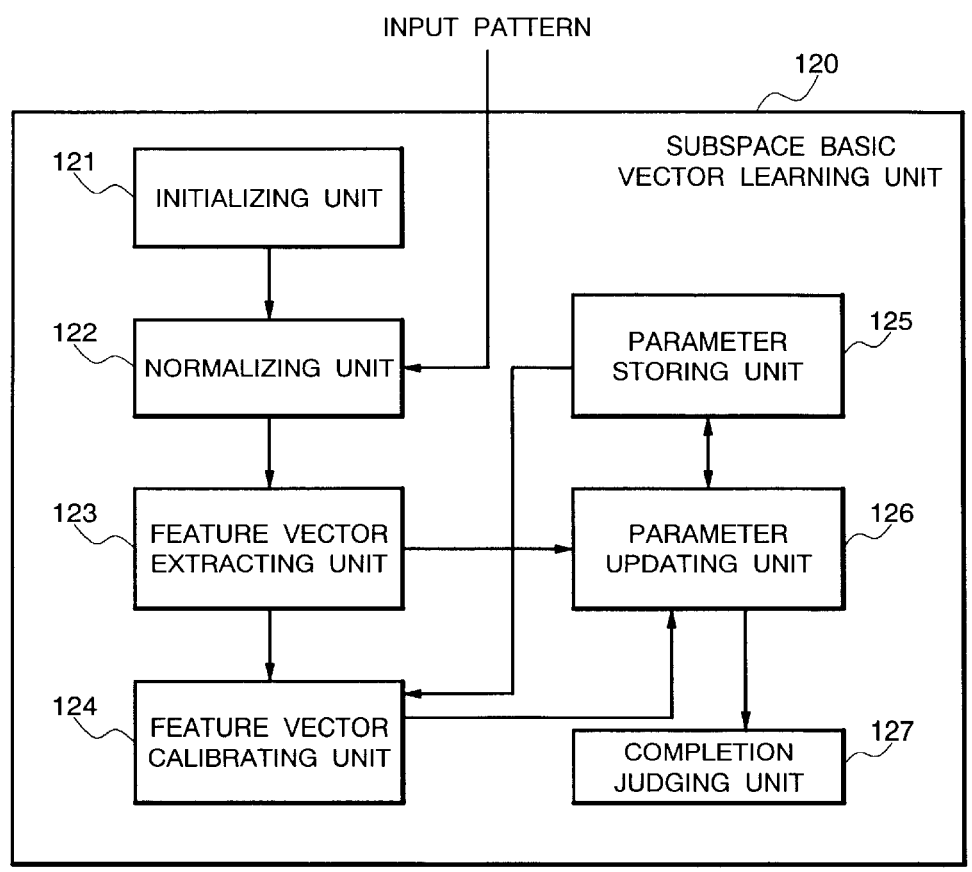
FIG. 2 is a block diagram showing the structure of a subspace basis vector learning unit of the first embodiment of the present invention.
Figure 3:
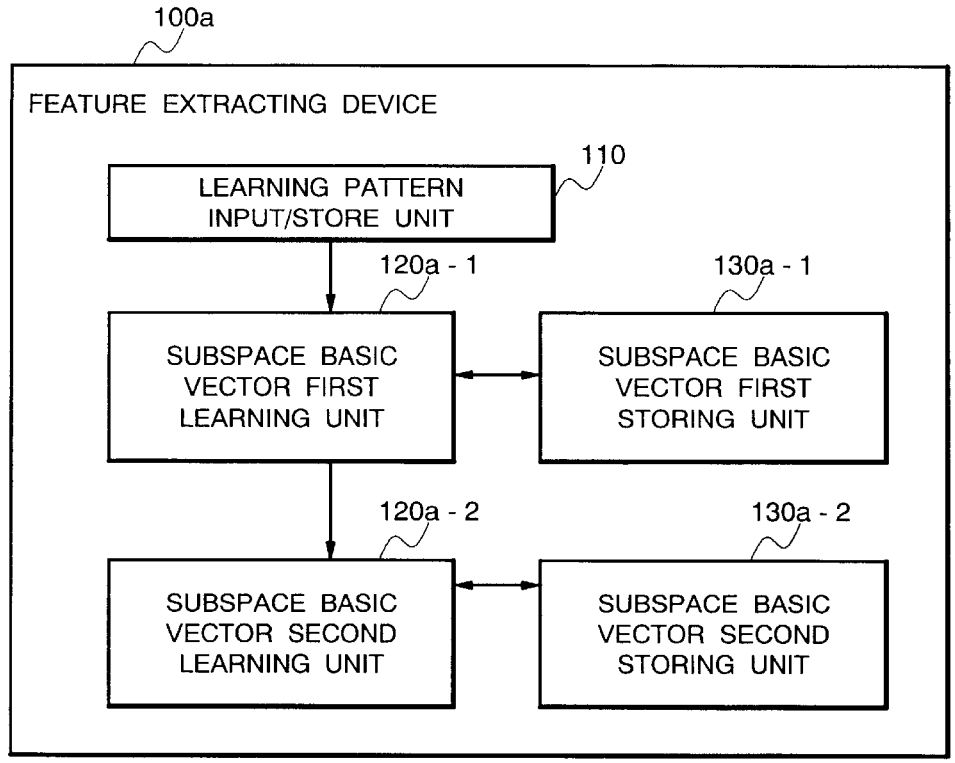
FIG. 3 is a block diagram showing the structure of a feature extracting device according to a third embodiment of the present invention.

The third embodiment of the present invention will be described with reference to FIG. 2.

In the third embodiment, two stages of the feature extracting devices of the first embodiment are hierarchically connected. Each feature extracting device comprises a learning pattern input/store unit 110a for receiving and storing learning patterns and the classes which the patterns belong to, and subclasses, a subspace basis vector first learning unit 120a-1 for deciding each basis vector of the first subspace group for use in feature extraction by learning, a subspace basis vector first storing unit 130a-1 for storing the first subspace basis vector decided by the learning, a subspace basis vector second learning unit 120a-2 for deciding each basis vector of the second subspace group for use in feature extraction by learning, and a subspace basis vector second learning unit 130a-2 for storing the second subspace basis vector decided by the learning.

Further, the subspace basis vector first learning unit 120a-1 and the subspace basis vector second learning unit 120a-2 respectively have the same structure as that of the subspace basis vector learning unit 120 of the first embodiment. Each comprises an initializing unit 121 for performing initial setting of a subspace group for use in feature extraction, a normalizing unit 122 for normalizing learning patterns, a feature vector extracting unit 123 for projecting the normalized learning patterns on each subspace and extracting features by calculating the square of a projected vector, a feature vector calibrating unit 124 for performing restraint processing of features on the calculated feature vectors to calibrate the feature vectors, a parameter storing unit 125 for storing various parameters including a feature restraint parameter, dispersion within a class, the average of a class, the dispersion, the average of feature vectors, and the like, a parameter updating unit 126 for updating various parameters and a basis vector of each subspace, and a completion judging unit 127 for judging completion of learning.

In this embodiment, each class each learning pattern belongs to is further classified into subclass, and which class and subclass each learning pattern belongs to is previously decided.

Each learning pattern together with a class p1 and a subclass p2 is received and stored by the learning pattern input/store unit 110a.

Classification of each learning pattern into subclasses is previously being performed, for example, with the parameter value showing the size of a variation as an index, depending on the type of the variation occurring to a pattern.

For example, when a pattern variation by rotation may occur, images converted by the rotation operation are classified into the same class.

In this case, images converted from some image by the rotation operation within the range of the predetermined rotation angle are classified into the same subclass as the "near" images.

For example, an image obtained by rotating the standard image at 0° to 10° is classified into the subclass p2-1, and an image obtained by rotating the standard image at 10° to 20° is classified into the subclass p2-2.

For example, in the case of the feature extraction from a face image, when taking a moving picture such as changing the direction of the face of each person and changing facial expressions, and picking up a learning pattern therefrom, images of frames consisting a series of moving pictures of the same person are classified into the same class, and further the images of the frames near in time, of them, are classified into the same subclasses. Thus, the classification into subclasses is prepared in advance.

The subspace basis vector first learning unit 120a-1 performs the completely same operation as that of the subspace basis vector learning unit 120 of the first embodiment.

Where, the subclass p2 is regarded as the "class" here, and the processing is performed here by replacing the term "class" used in the description of the first embodiment with the term "subclass".

Therefore, the subspace basis vector first learning unit 120a-1 learns while updating the basis vectors of the first subspace group so as to maximize the ratio (variation between subclasses/variation within a subclass).

Thus obtained basis vectors of the first subspace group are stored in the subspace basis vector first storing unit 130a-1.

After completion of this learning, the subspace basis vector second learning unit 120a-2 will learn the second subspace.

The learning will progress as follows.

The learning pattern supplied by the learning pattern input/store unit 110a is normalized by the normalizing unit 122 forming the subspace basis vector learning unit 120a-1, projected on each first subspace by the feature vector extracting unit 123 also forming the subspace basis vector learning unit 120a-1, and then the feature vectors are calculated by calculating the squares of each projected vector.

In the projection processing on the first subspace group, basis vectors of each subspace are read out from the subspace basis vector first storing unit 130a-1.

The subspace basis vector second learning unit 120a-2 learns with the feature vectors regarded as the learning vectors.

Namely, thus calculated feature vectors are sent to the subspace basis vector second learning unit 120a-2, and hereinafter, the subspace basis vector second learning unit 120a-2 learns by performing the completely same operation as that of the subspace basis vector learning unit 120 of the first embodiment.

Here, the processing is performed by replacing the "learning pattern" in the description of the operation of the first embodiment with the above feature vectors calculated by the subspace learning unit 1, 202, so as to maximize the ratio (variation between classes/variation within a class).

Thus, even if a pattern variation is too great to be absorbed into the first stage of subspace, this embodiment is able to stabilize the extracted feature vector, by absorbing the pattern variation into two stages of subspaces, thereby realizing a high ratio (variation between classes/variation within a class).

As the result, features more suitable for pattern recognition can be learned.

In this embodiment, although the subspace basis vector learning unit 120a-1 and the subspace basis vector learning unit 120a-2 are designed to extract features by respectively projecting an input pattern on the first and second subspace groups to calculate the square of the projection length thereof, this portion may be designed to extract features by use of "generalized projection length" as having been described in the second embodiment.

Figure 4:
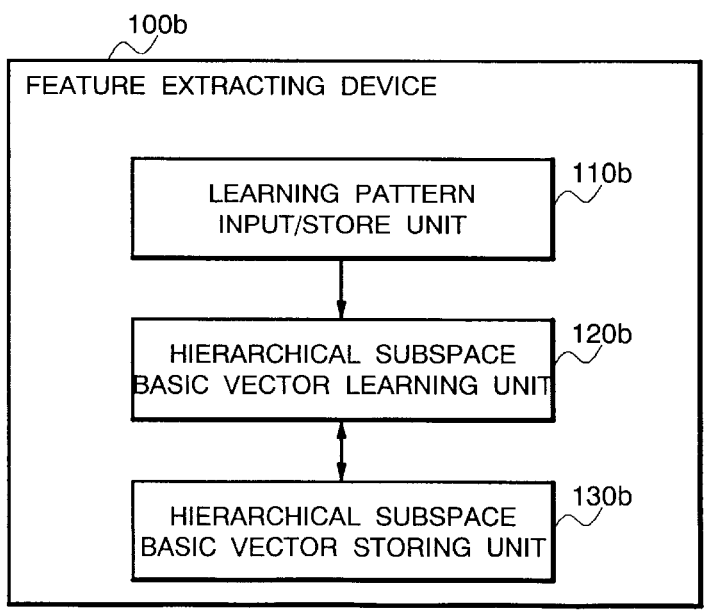
FIG. 4 is a block diagram showing the structure of a feature extracting device according to the fourth embodiment of the present invention.
Figure 5:
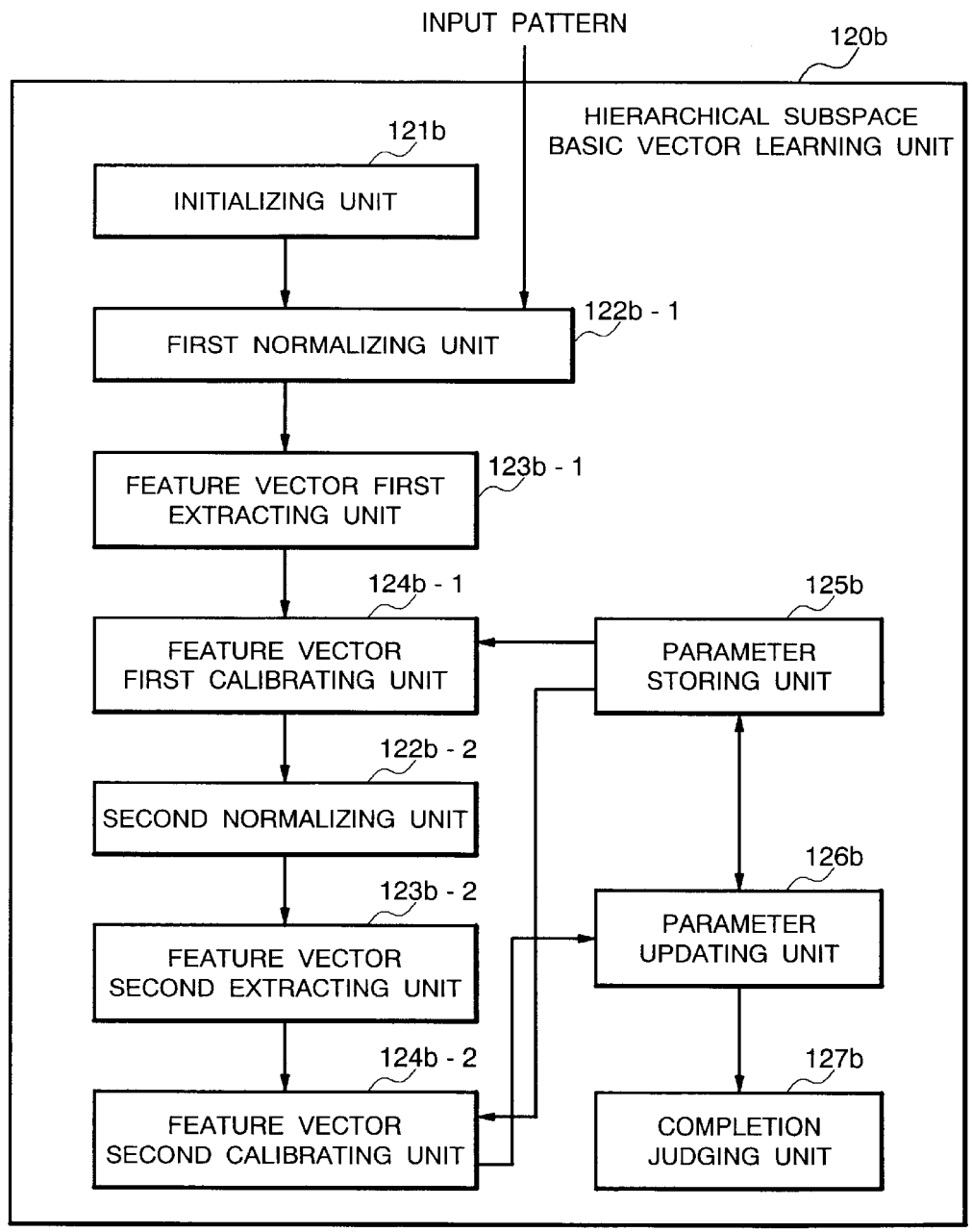
FIG. 5 is a block diagram showing the structure of a hierarchical subspace basis vector learning unit according to a fourth embodiment of the present invention.

The fourth embodiment of the present invention will be described with reference to FIG. 4 and FIG. 5.

The fourth embodiment of the present invention comprises a learning pattern input/store unit 110c for receiving and storing learning patterns and classes (categories) which the learning patterns belong to, a hierarchical subspace basis vector learning unit 120c for deciding each basis vector of a hierarchical subspace group for use in feature extraction by learning, and a hierarchical subspace basis vector storing unit 130c for storing the hierarchical subspace basis vectors decided by the above learning.

The hierarchical subspace basis vector learning unit 120c further includes an initializing unit 121c for performing initial setting of a hierarchical subspace group for use in feature extraction, a first normalizing unit 122c-1 for normalizing learning patterns, a feature vector first extracting unit 123c-1 for projecting the normalized learning patterns to each first subspace and extracting the first features by calculating the squares of projected vectors, a feature vector first calibrating unit 124c-1 for performing restraint processing of features on the calculated first feature vectors and calibrating the first feature vectors, a second normalizing unit 122c-2 for normalizing the calibrated first feature vectors upon receipt of them, a feature vector second extracting unit 123c-2 for projecting the normalized first feature vectors on each second subspace and extracting the second features by calculating the squares of the projected vectors, a feature vector second calibrating unit 124c-2 for performing restraint processing of features on the calculated second feature vectors and calibrating the second feature vectors, a parameter storing unit 308 for storing various parameters including a feature restraint parameter, the dispersion within a class, the average of a class, the dispersion, the average of the second feature vectors, and the like, a parameter updating unit 312 for updating various parameters and the basis vectors of each hierarchical subspace, and a completion judging unit 313 for judging completion of learning.

The operation of this embodiment will be described with reference to FIG. 4, this time.

At first, the initializing unit 121c initializes the respective basis vectors of each hierarchical subspace and various parameters, before starting the learning.

Random initial values by random numbers are given to the respective components $W_{s,j,k,i}$ of the respective hierarchical subspace basis vectors stored in the hierarchical subspace basis vector storing unit 130c, and the respective basis vectors are made normalized-orthogonal in every subspace by the Gram-Schmid orthogonalization.

The initializing unit 121c sets the respective parameters of the average $<C_{2,j}>$, the average within a class $<C_{2,j(p)}>$, the dispersion over classes $\sigma^2_{j,B}$, and the dispersion within a class $\sigma^2_{j,W}$, at the predetermined initial values, and sends the same to the parameter storing unit 308.

The initializing unit 121c initializes all the values of the restraint parameters $V_{s,i,j}$ at zero and sends the same to parameter storing unit 308.

The learning pattern $I_{p0i}$ ($1 \leq i \leq N$, where N is the number of order of a pattern) and the class p the pattern belongs to, which have been received and stored by the learning pattern input/store unit 110c, are sent to the hierarchical subspace basis vector learning unit 120c.

Hereinafter, the processing by the first normalizing unit 122c-1, the feature vector first extracting unit 123c-1, and the feature vector first calibrating unit 124c-1 are the same as that one having been described in the first embodiment.

Specifically, the learning pattern $I_{pi}$ normalized by the first normalizing unit 122c-1 is processed by the feature vector first extracting unit 123c-1 according to the following expression and the first feature vector $C'_{1,j}$ is calculated.

$$C'_{1,j} = \sum_{k=1,2} S^2_{1,j,k} = \sum_{k=1,2} \left( \sum_i W_{1,j,k,i} \cdot I_{pi} \right)^2, (1 \leq j \leq M)$$

The feature vector first calibrating unit 124c-1 reads out the restraint parameter $V_{1,i,j}$ stored in the parameter storing unit 308, so to do the following calibration processing.

$$C''_{1,j} = C'_{1,j} - \sum_{1 < j} V_{1,jl} C'_{1,l}, (1 \leq j \leq M)$$

The second normalizing unit 122c-2, the feature vector second extracting unit 123c-2, and the feature vector second calibrating unit 124c-2 will perform the same processing on this $C'_{1,j}$.

Specifically, the second normalizing unit 122c-2 will perform the following normalizing processing on the first feature vector $C'_{1,j}$ calibrated as the above.

$$C_{1,i} = C''_{1,i} / C_{\text{rms}}, C_{\text{rms}} = \sqrt{\sum_{i'} C''_{1,i}{}^2}$$

After all, the feature vector second extracting unit 123c-2 will calculate the following feature.

$$C'_{2,j} = \sum_{k=1,2} S^2_{2,j,k} = \sum_{k=1,2} \left( \sum_i W_{2,j,k,i} \cdot C_{1,i} \right)^2, (1 \leq j \leq M')$$

The feature vector second calibrating unit 124c-2 reads out the restraint parameter $V_{2,ij}$ stored in the parameter storing unit 308, so to perform the following calibration.

$$C_{2,j} = C'_{2,j} - \sum_{1 < j} V_{2,jl} C'_{2,1}, (1 \leq j \leq M')$$

The parameter updating unit 312 updates the basis vectors of each hierarchical subspace so as to increase the ratio between the variation between classes and the variation within a class as for thus obtained second feature vectors, or final features, $C_{2,j}$.

Specifically, assuming that the variation between classes as for the feature vector $C_{2,j}$ is defined as $\sigma^2_{j,B}$ and the variation within a class is defined as $\sigma^2_{j,W}$, each basis vector $W_{2,j,k}, W_{1,j,k,i}$ is updated, with $T = \Sigma_j (\sigma^2_{j,B}/\sigma^2_{j,W})$ defined as an estimate function, in the direction of increasing T along the gradient $(\partial T/\partial W_{2,j,k,i})$ and the gradient $(\partial T/\partial W_{1,j,k,i})$ so as to increase this value.

More concretely, each vector, $W_{2,j,k,i}$ and $W_{1,j,k,i}$ is updated according to the following expression.

Namely, when the learning pattern $I_{pi}$ belonging to the class p is supplied, each basis vector will be updated according to the following expression.

$$W_{2,j,k,i} \leftarrow W_{2,j,k,i} + \Delta W_{2,j,k,i}$$

$$\Delta W_{2,j,k,i} = \varepsilon[(\langle C_{2,j}(p)\rangle - \langle C_{2,j}\rangle) \cdot S_{2,j,k} \cdot C_{1,i}/\sigma_{j,W}^2 -$$

$$(C_{2,j} - \langle C_{2,j}(p)\rangle) \cdot S_{2,j,k} \cdot C_{1,i} \cdot \sigma_{j,B}^2/\sigma_{j,W}^4],$$

$$(1 \le i \le M, 1 \le k \le 2, 1 \le j \le M')$$

$$W_{1,j,k,i} \leftarrow W_{1,j,k,i} + \Delta W_{1,j,k,i}$$

$$\Delta W_{1,j,k,i} = \varepsilon' \sum_{k',j'} \frac{1}{\sigma_{j',W}^2} (\langle C_{2,j'}(p)\rangle - \langle C_{2,j'}\rangle) \cdot S_{2,j',k'} \cdot$$

$$W_{2,j',k',j} \cdot S_{1,j,k} \cdot I_{p,i}/C_{\text{rms}} - \varepsilon' \sum_{j'} \frac{1}{\sigma_{j',W}^2} (\langle C_{2,j'}(p)\rangle -$$

$$\langle C_{2,j'}\rangle) \cdot C_{2,j'} \cdot C_{1,j} \cdot S_{1,j,k} \cdot I_{p,i}/C_{\text{rms}} -$$

$$\varepsilon' \sum_{k',j'} \frac{\sigma_{j',B}^2}{\sigma_{j',W}^4} (C_{2,j'} - \langle C_{2,j'}(p)\rangle) \cdot S_{2,j',k} \cdot W_{2,j',k',i} \cdot$$

$$S_{1,j,k} \cdot I_{p,i}/C_{\text{rms}} + \varepsilon' \sum_{j'} \frac{\sigma_{j',B}^2}{\sigma_{j',W}^4} (C_{2,j'} - \langle C_{2,j'}(p)\rangle) \cdot$$

$$C_{2,j'} \cdot C_{1,j} \cdot S_{1,j,k} \cdot I_{p,i}/C_{\text{rms}},$$

$$(1 \le j \le M, 1 \le i \le N, 1 \le k \le 2)$$

Where, the symbols, $\varepsilon$ and $\varepsilon'$ are predetermined positive parameters for deciding the learning rate, the symbol $\langle C_{2,j}\rangle$ is the parameter showing the average value of the feature $C_{2,j}$, the symbol $\langle C_{2,j(p)}\rangle$ is the parameter showing the average value of the feature $C_{2,j}$ when the learning pattern belonging to the class p is supplied, the symbol $\sigma_{j,B}^2$ is the parameter showing the dispersion over classes as for the feature $C_{2,j}$, the symbol $\sigma_{j,W}^2$ is the parameter showing the dispersion within a class as for the feature $C_{2,j}$, and these parameters are read out from the parameter storing unit 308.

The symbol $C_{2,j}$ indicates the feature value corresponding to the current input pattern $I_{pi}$. In this update rule, although the term directly depending on the restraint parameters $V_{1,i,j}$ and $V_{2,i,j}$ are omitted, of course, it may be designed to adopt an update rule with these terms employed thereto.

In this case, the update rule will be given by the following expression.

$$W_{2,j,k,i} \leftarrow W_{2,j,k,i} + \Delta W_{2,j,k,i}$$

$$\Delta W_{2,j,k,i} = \varepsilon \Bigg[ (\langle C_{2,j}(p)\rangle - \langle C_{2,j}\rangle) \cdot S_{2,j,k} \cdot C_{1,i}/\sigma_{j,W}^2 -$$

$$(C_{2,j} - \langle C_{2,j}(p)\rangle) \cdot S_{2,j,k} \cdot C_{1,i} \cdot \sigma_{j,B}^2/\sigma_{j,W}^4 -$$

$$\left\{ \sum_{l>j} (\langle C_{2,l}(p)\rangle - \langle C_{2,l}\rangle) \cdot V_{2,l,j}/\sigma_{l,W}^2 \right\} \cdot S_{2,j,k} \cdot C_{1,i} +$$

$$\left\{ \sum_{l>j} (C_{2,l} - \langle C_{2,l}(p)\rangle) \cdot V_{2,l,j} \cdot \sigma_{l,B}^2/\sigma_{l,W}^4 \right\} \cdot S_{2,j,k} \cdot C_{1,i} \Bigg]$$

$$(1 \le i \le M, 1 \le k \le 2, 1 \le j \le M')$$

$$W_{1,j,k,i} \leftarrow W_{1,j,k,i} + \Delta W_{1,j,k,i}$$

$$\Delta W_{1,j,k,i} = \varepsilon' \sum_{k',j'} \frac{1}{\sigma_{j',W}^2} (\langle C_{2,j'}(p)\rangle - \langle C_{2,j'}\rangle) \left( D_{j',k',j} - \sum_{l<j'} V_{2,j',l} D_{l,k',j} \right) \cdot$$

$$S_{1,j,k} \cdot I_{p,i}/C_{\text{rms}} -$$

$$\varepsilon' \sum_{j'} \frac{1}{\sigma_{j',W}^2} \left( \langle C_{2,j'}(p)\rangle - \langle C_{2,j'}\rangle \right) C_{2,j'} \left( C_{1,j} - \sum_{l<j} V_{1,l,j} C_{1,l} \right) \cdot$$

$$S_{1,j,k} \cdot I_{p,i}/C_{\text{rms}} - \varepsilon' \sum_{k',j'} \frac{\sigma_{j',B}^2}{\sigma_{j',W}^4} \Bigg( C_{2,j'} -$$

$$\langle C_{2,j'}(p)\rangle \Bigg) \left( D_{j',k',j} - \sum_{l<j'} V_{2,j',l} D_{l,k',j} \right) \cdot$$

$$S_{1,j,k} \cdot I_{p,i}/C_{\text{rms}} + \varepsilon' \sum_{j'} \frac{\sigma_{j',B}^2}{\sigma_{j',W}^4} (C_{2,j'} -$$

$$\langle C_{2,j'}(p)\rangle) \cdot C_{2,j'} \left( C_{1,j} - \sum_{l<j} V_{1,l,j} C_{1,l} \right) \cdot$$

$$S_{1,j,k} \cdot I_{p,i}/C_{\text{rms}},$$

$$D_{l,k',j} \equiv S_{2,l,k'} \left( W_{2,l,k',j} - \sum_{l'>l} W_{2,l,k',l'} \cdot V_{1,l',j} \right),$$

$$(1 \le j \le M, 1 \le i \le N, 1 \le k \le 2)$$

According to these expressions, each basis vector will be updated.

Since the basis vectors obtained by the above updating processing are not necessarily normalized-orthogonal, the parameter updating unit 312 performs the normalized orthogonalization on the respective updated basis vectors by the Gram-Schmid orthogonalization.

The parameter updating unit 312 performs the processing as shown in the following expression and updates each parameter of the average $\langle C_{2,j}\rangle$, the average within a class $\langle C_{2,j(p)}\rangle$, the dispersion over classes $\sigma_{j,B}^2$, and the dispersion within a class $\sigma_{j,W}^2$ stored in the parameter storing unit 308.

$$\langle C_{2,j}\rangle \leftarrow \langle C_{2,j}\rangle (1-\epsilon_1) + \epsilon_1 \cdot C_{2,j}$$

$$\langle C_{2,j}(p)\rangle \leftarrow (1-\epsilon_2) \langle C_{2,j}(p)\rangle + \epsilon_2 \cdot C_{2,j}$$

$$\sigma_{j,W}^2 \leftarrow (1-\epsilon_3) \sigma_{j,W}^2 + \epsilon_3 (C_{2,j} - \langle C_{2,j}(p)\rangle)^2$$

$$\sigma_{j,T}^2 \leftarrow (1-\epsilon_4) \sigma_{j,T}^2 + \epsilon_4 (C_{2,j} - \langle C_{2,j}\rangle)^2$$

$$\sigma_{j,B}^2 = \sigma_{j,T}^2 - \sigma_{j,W}^2 \qquad (1 \le j \le M')$$

Where, the symbols $\epsilon_1$ to $\epsilon_4$ are positive constants much smaller than 1, which have been previously determined.

Further, the symbol p indicates the class the current learning pattern belongs to.

The parameter updating unit 312 further updates the restraint parameter $V_{s,i,j}$ stored in the parameter storing unit 308 according to the following expression.

$$V_{1,i,j} \leftarrow V_{1,i,j} + \Delta V_{1,i,j} = V_{1,i,j} + \epsilon_5(C_{1,i} - <C_{1,i}>)(C_{1,j} - <C_{1,j}>), \ (2 \leq i \leq M, j<i)$$

$$V_{2,i,j} \leftarrow V_{2,i,j} + \Delta V_{2,i,j} = V_{2,i,j} + \epsilon_5(C_{2,i} - <C_{2,i}>)(C_{2,j} - <C_{2,j}>), \ (2 \leq i \leq M', j<i)$$

Where, the symbol $\epsilon_5$ is a positive constant much smaller than 1, which has been previously determined.

At a time of completing the above processing, the learning pattern input/store unit 110c receives the next learning pattern and repeats the same processing.

The completion judging unit 313 judges whether the learning has been performed Nmax times, predetermined times, on all the learning patterns, and when this condition is satisfied, it completes the learning.

Or, the completion judging unit 313 may be designed to examine a change of the ratio (variation between classes/variation within a class) and then complete the learning when the increase becomes smaller than the predetermined value.

Thus, even if a pattern variation is too great to be absorbed into the first stage of subspace, this embodiment is able to stabilize the extracted feature vectors, by absorbing the pattern variation in two stages of subspaces, thereby realizing a high ratio (variation between classes/variation within a class).

In this embodiment, although the parameter updating unit performs the normalized orthogonalization on each subspace basis vector by performing the Gram-Schmid orthogonalization, it may be designed to extract features by use of "generalized projection length" as described in the second embodiment, instead of this normalized orthogonalization.

Figure 6:
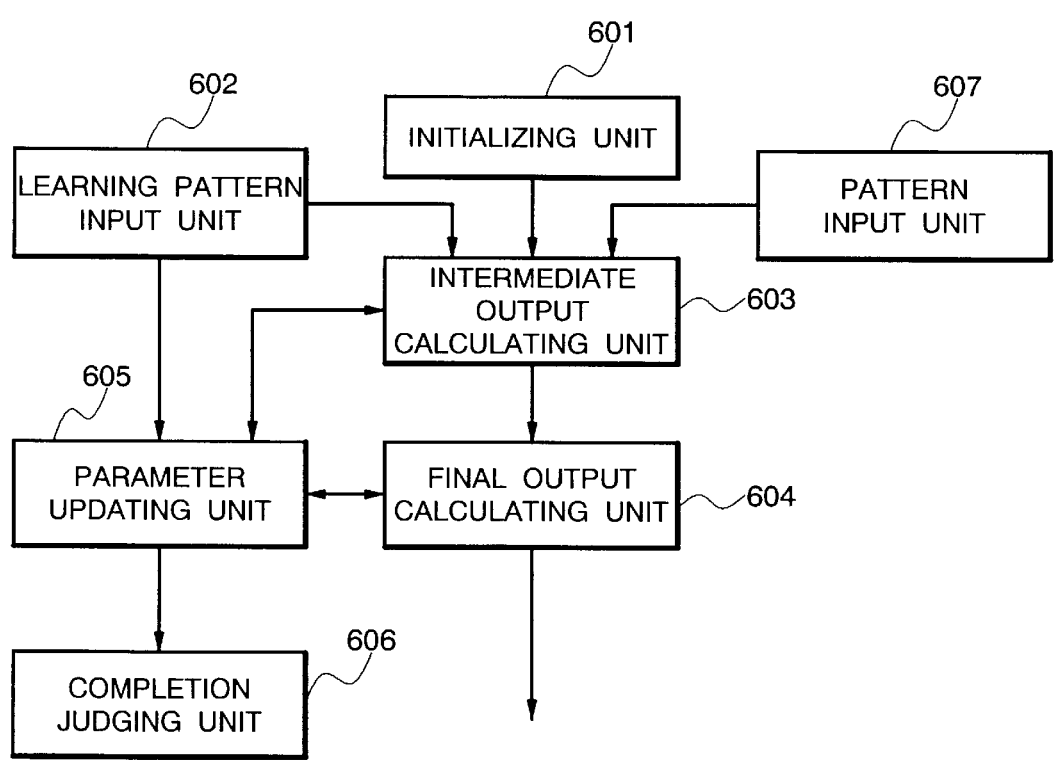
FIG. 6 is a block diagram showing the structure of a feature extracting device according to a fifth embodiment of the present invention.

The fifth embodiment of the present invention will be described. FIG. 6 is a block diagram showing the flow of the processing about the fifth embodiment.

The fifth embodiment of the present invention comprises an initializing unit 601 for initializing each parameter, a learning pattern input unit 602 for receiving and storing learning patterns consisting of each pair of an input pattern and a desired output pattern corresponding to the input pattern, a pattern input unit 607 for receiving input patterns in assumption mode of learning completion, an intermediate output calculating unit 603 for calculating an intermediate output from the input pattern, a final output calculating unit 604 for calculating a final output from the above intermediate output, a parameter updating unit 605 for updating and modifying various parameters of the intermediate output calculating unit 603 and the final output calculating unit 604 from the above final output and the desired output pattern, and a completion judging unit 606 for judging completion of the learning.

The operation of the embodiment will be described with reference to FIG. 6.

At first, the initializing unit 601 initializes various parameters before start of learning.

Random initial values by random numbers are given to the parameter, $W_{1,j,k,i}$ stored in the intermediate output calculating unit 603 and the parameter, $W_{2,j,k,i}$ stored in the final output calculating unit 604.

In the learning mode, the learning pattern input unit 602 receives and stores learning patterns consisting of each pair of an input pattern and a desired output pattern corresponding to the input pattern.

The intermediate output calculating unit 603 performs the following processing on the input pattern $I_{poi}$ ($1 \leq i \leq N$, where N is the number of order of the pattern), so to calculate an intermediate output.

Namely, the intermediate output calculating unit 603 normalizes the input pattern $I_{p0i}$ as follows.

$$I_{pi} = I_{p0i} \Big/ \sqrt{\sum_i I_{p0i}^2}$$

The intermediate output calculating unit 603 performs the following processing, using the stored parameter $W_{1,j,k,i}$, so to calculate the intermediate output $C_{1,j}$ ($1 \leq j \leq M$, where M is a predetermined natural number).

$$C_{1,j} = \sum_{k=1,2} S_{1,j,k}^2 = \sum_{k=1,2} \left( \sum_i W_{1,j,k,i} \cdot I_{pi} \right)^2, \ 1 \leq j \leq M$$

The final output calculating unit 604, upon receipt of this intermediate output, performs the following processing on it, so to calculate a final output.

Namely, the final output calculating unit 604 normalizes the intermediate output by the processing as shown in the following expression.

$$C'_{1,i} = C_{1,i} / C_{rms}, \quad C_{rms} = \sqrt{\sum_{i'} C_{1,i'}^2}$$

The final output calculating unit 604 performs the following processing, using the stored parameter $W_{2,j,k,i}$, so to calculate the final output $C_{2,j}$ ($1 \leq j \leq M'$, where M' is the number of the next order of the desired output pattern).

$$C_{2,j} = \sum_{k=1,2} S_{2,j,k}^2 = \sum_{k=1,2} \left( \sum_i W_{2,j,k,i} \cdot C'_{1,i} \right)^2, \ 1 \leq j \leq M'$$

The parameter updating unit 605 updates each parameter, $W_{1,j,k,i}$, $W_{2,j,k,i}$, so as to conform the above final output $C_{2,j}$ to the desired output pattern $T_{p,j}$ ($1 \leq j \leq M'$) supplied and stored by the learning pattern input unit 602 as much as possible.

Namely, with the average square error of the desired output pattern $T_{p,j}$ and the final output $C_{2,j}$ defined as $E = <(C_{2,j} - T_{p,j})^2>$ (the symbol $<\cdot>$ indicates the average operation relative to the learning pattern), in order to decrease this error, each parameter, $W_{1,k,i}, W_{2,j,k,i}$ is updated in the direction of decreasing the average square error E along the gradient $(-\partial E/\partial W_{2,j,k,i})$ and the gradient $(-\partial E/\partial W_{1,j,k,i})$.

More concretely, each parameter, $W_{1,j,k,i}, W_{2,j,k,i}$ is updated according to the following expression.

$$W_{2,j,k,i} \leftarrow W_{2,j,k,i} + \Delta W_{2,j,k,i}$$

$$\Delta W_{2,j,k,i} = \epsilon (T_{p,j} - C_{2,j}) \cdot S_{2,j,k'} \cdot C'_{1,i} (1 \leq i \leq M, 1 \leq k \leq 2, 1 \leq j \leq M')$$

$$W_{1,j,k,i} \leftarrow W_{1,j,k,i} + \Delta W_{1,j,k,i}$$

$$\Delta W_{1,j,k,i} = \frac{\epsilon'}{C_{rms}} \sum_{l,k'} (T_{p,l} - C_{2,l}) \cdot S_{2,l,k'} \cdot W_{2,l,k',j} \cdot S_{1,k,j} \cdot I_{p,i} -$$

$$\frac{\epsilon'}{C_{rms}} \sum_l (T_{p,i} - C_{2,l}) \cdot C_{2,l} \cdot C'_{1,j} \cdot S_{1,k,j} \cdot I_{p,i},$$

$$(1 \leq i \leq N, 1 \leq k \leq 2, 1 \leq j \leq M)$$

Where, the symbols, $\epsilon$ and $\epsilon'$ are predetermined positive parameters for deciding the learning rate.

The symbols $S_{2,j,k}, C'_{1,i}, S_{1,k,j}$, and $C_{rms}$ are the amounts respectively appearing in the expressions (30), (31), and (32), and these values are respectively supplied from the final output calculating unit 604 and the intermediate output calculating unit 603.

The symbol $C_{2,j}$ indicates the final output calculated by the final output calculating unit 604, and the symbol $I_{pi}$ indicates the normalized input pattern.

After completing the above processing, the learning pattern input unit 602 receives and stores the next learning pattern and continues the same processing.

The completion judging unit 606 judges whether the output error E becomes smaller than the predetermined value Emax; when the output error becomes smaller than Emax, or when learning operation has been Nmax times, predetermined times, performed on all the learning patterns, the learning mode is finished.

The operation in the assumption mode, for calculating a desired output as for a given input, using thus learned input/output relationship, will be described.

The pattern input unit 607 receives an input pattern.

The intermediate output calculating unit 603 performs the processing as shown in the expression (29) and the expression (30) on the input pattern, so to calculate an intermediate output.

Upon receipt of the intermediate output, the final output calculating unit 604 performs the processing as shown in the expression (31) and the expression (32) on it, so to calculate the final output, and supplies it as an output pattern.

Although in this embodiment, the final output calculating unit 604 normalizes an intermediate output according to the processing of the expression (31), this processing of the expression (31) may be replaced by the processing using a sigmoid function as shown in the following expression.

$$C_{1,i}=f(C_{1,i}), f(x)=1/\{1+\exp(-2x/u_0)\}$$

Where, the symbol f(x) is a function called a sigmoid function, and the symbol $u_0$ is a predetermined parameter.

Also in this case, each parameter, $W_{1,j,k,i}$, $W_{2,j,k,i}$ is updated in the direction of decreasing the average square error E along the gradient $(-\partial E/\partial W_{2,j,k,i})$ and the gradient $(-\partial E/\partial W_{1,j,k,i})$ of the average square error, E.

Figure 7:
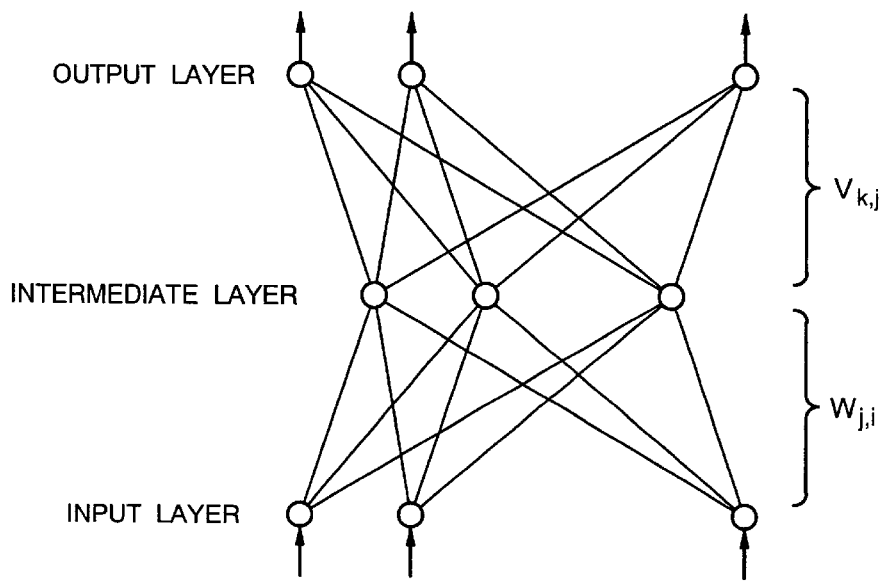
FIG. 7 is a view showing the structure of the conventional three-layered perceptron neural network.
Figure 8:
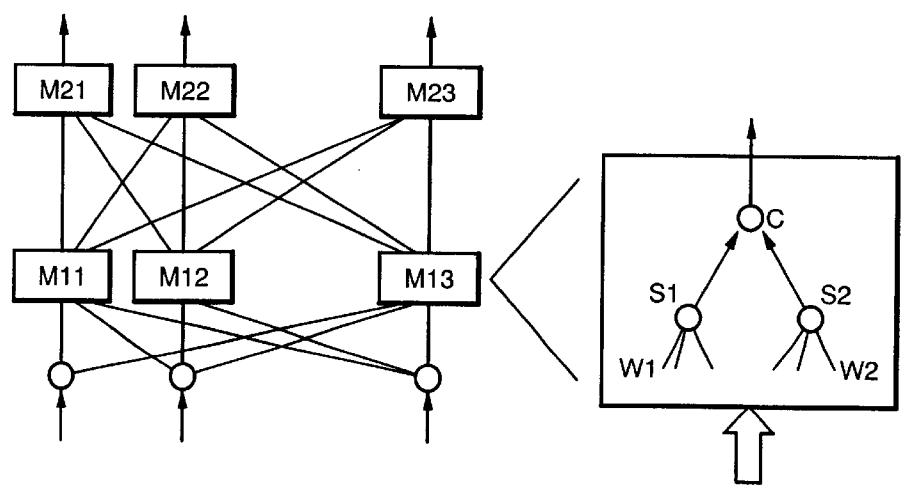
FIG. 8 is a view showing the structure of a three-layered perceptron neural network according to the present invention.

This embodiment can be considered as follows; a processing unit forming each layer of a multi-layered perceptron neural network as shown in FIG. 7 is replaced by a processing unit, as shown in FIG. 8, such as normalizing input vectors on the unit, with each subspace stored, projecting them on each subspace, and hence calculating and supplying the generalized projection length thereof.

Since the present invention adopts such a structure as stabilizing an output under a pattern deviation, using projection on subspaces, it can extremely decrease the time required for learning, compared with the ordinal multi-layered perceptron neural network, and realize pattern learning tough against a pattern deviation at ease.

It is known that if a subspace is properly set, the square of the projection length thereon is stable in a pattern variation.

Therefore, the present invention can extract feature vectors tough against a pattern variation.

The parameter updating unit develops learning so as to increase the ratio of variation between classes/variation within a class, thereby enabling optimization of each subspace and feature extraction having the large ratio of variation between classes/variation within a class, in other words, feature extraction suitable for pattern recognition.

Since it can realize pattern learning tough against a pattern variation without requiring extravagant learning, the pattern learning device of the present invention comprises each processing unit (the intermediate output calculating unit 603 and the final output calculating unit 604) forming each layer of the device, and a means for projecting each input pattern, having been normalized, on a subspace and calculating the projection length of a projected vector, or the square of the generalized projection length as the output of the processing unit.

Further, it comprises the parameter updating unit 605 for updating each parameter of each layer and each processing unit by learning so as to conform the output pattern obtained by the final output calculating unit 604 to a desired output pattern.

Since the projection length on the subspace, if a subspace is properly set, or generalized projection length becomes stable under a pattern variation, each subspace is optimized according as the learning by the parameter updating means progresses, and hence the pattern learning device of the present invention can easily realize pattern learning tough against a pattern variation.

Because of building in such a structure as stabilizing an output under a pattern deviation, using the projection on the subspaces, in advance, it can extremely decrease the time required for learning compared with the general multi-layered perceptron neural network.

The present invention is not restricted to the above-mentioned embodiments, but various modifications may be adopted within the range of the technical spirit.

As set forth hereinabove, the present invention is effective in deciding and extracting features tough against a pattern variation and suitable for pattern recognition. Further, the present invention is effective in realizing pattern learning tough against a pattern variation without extravagant learning.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A feature extracting device comprising:
   a feature vector calculating module for projecting a learning pattern to be recognized on a subspace group, so to calculate squares of projection length on each subspace as feature vectors; and
   a subspace basis vector learning module including at least a parameter updating module for updating basis vectors of each subspace forming the subspace group, so as to increase the ratio of variation between classes to variation within a class, as for each component of the feature vectors.

2. A feature extracting device as set forth in claim 1, in which said feature vector calculating module normalizes the learning pattern, to project the same on the subspace group, and calculates squares of projection length on each subspace, or quantity derived from said squares of projection length, as feature vectors.

3. A feature extracting device as set forth in claim 1, in which
   said subspace basis vector learning module includes a calibrating module for calibrating the feature vectors by performing restraint processing among features based on a restraint parameter predetermined as for the calculated feature vectors.

4. A feature extracting device as set forth in claim 1, in which
   said feature vector calculating normalizes the learning pattern, to project the same on the subspace group, and calculates squares of projection length on each subspace, or quantity derived from there, as feature vectors, and said subspace vector learning module includes a calibrating module for calibrating the feature vectors by performing restraint processing among features based on a restraint parameter predetermined as for the calculated feature vectors.

5. A feature extracting device as set forth in claim 1, in which said parameter updating module performs normalized orthogonalization on the basis vectors obtained by update processing according to a Gram-Schmid orthogonalization.

6. A feature extracting device as set forth in claim 1, in which said feature vector calculating module normalizes the learning pattern, to project the same on the subspace group, and calculates squares of projection length on each subspace, or quantity derived from said squares of projection length, as feature vectors, and said parameter updating module performs normalized orthogonalization on the basis vectors obtained by update processing, according to a Gram-Schmid orthogonalization.

7. A feature extracting device as set forth in claim 1, in which said feature vector calculating module normalizes the learning pattern, to project the same on the subspace group, and calculates squares of projection length on each subspace, or quantity derived from said squares of projection length, as feature vectors, said subspace basis vector learning module includes calibrating module for calibrating the feature vectors by performing restraint processing among features based on a restraint parameter predetermined as for the calculated feature vectors, and said parameter updating module performs normalized orthogonalization on the basis vectors obtained by update processing, according to a Gram-Schmid orthogonalization.

8. A feature extracting device as set forth in claim 1, in which said feature vector calculating module normalizes the learning pattern, to project the same on the subspace group, and calculates squares of generalized projection length on each subspace as feature vectors.

9. A feature extracting device as set forth in claim 1, in which said subspace basis vector learning unit performs update processing of the basis vectors for increasing the ratio of the variation between classes to the variation within a class as for the feature vectors, by updating the basis vectors so as to make the respective components of the feature vectors have no correlation to each other or make said respective components independent, and simultaneously so as to increase the ratio of the variation between classes to the variation within a class as for the respective components of the feature vectors.

10. A feature extracting device for deciding features, using a data set, as learning data, comprising input patterns, class names C the patterns belong to, and a series of subclass names $C_m$ (m=1 to n, where n is an integer 1 and more, assuming that the subclasses are hierarchically classified finer as m becomes larger), the device by comprising:

(n+1) stages of feature extracting layers, a first stage of feature extracting layer comprising
a first feature vector calculating module for projecting an input learning pattern, after having been normalized, on a first subspace group, and calculating squares of generalized projection length on each subspace, or quantity derived from said squares of projection length, as first feature vectors; and a first subspace basis vector learning module including at least a first parameter updating module for updating basis vectors of each subspace forming the first subspace group, so as to increase the ratio of variation between subclasses to variation within a subclass as for the n-th subclass, including the most segmented subclass, with respect to the first feature vectors, a k-th (k=2 to n) stage of feature extraction layer comprising:

a k-th feature vector calculating module for projecting the (k−1)-th feature vectors calculated in the (k−1)-th stage of feature extraction layer, after having been normalized, on the k-th subspace group, and calculating squares of generalized projection length on each subspace, or quantity derived from said squares of projection length as the k-th feature vectors; and a k-th subspace basis vector learning module including at least a k-th parameter updating module for updating basis vectors of each subspace forming the k-th subspace group, so as to increase the ratio (variation between subclasses/variation within a subclass) as for the (n+1-k)-th subclass, with respect to the k-th feature vectors.

11. A feature extracting device as set forth in claim 10, in which an (n+1)-th stage of feature extraction layer comprises:

an (n+1)-th feature vector calculating module for projecting the n-th feature vectors calculated in the n-th stage of feature extraction layer, after having been normalized, on the (n+1)-th subspace group, and calculating squares of generalized projection length on each subspace, or quantity derived from said squares of projection length as the k-th feature vectors; and an (n+1)-th subspace basis vector learning module including at least an (n+1)-th parameter updating module for updating basis vectors of each subspace forming the (n+1)-th subspace group, so as to increase the ratio of variation between classes to variation within a class as for the final feature vectors.

12. A feature extracting device as set forth in claim 10, in which said subspace basis vector learning module of the respective feature extraction layers includes a calibrating module for calibrating the feature vectors by performing restraint processing among features, based on a restraint parameter predetermined as for the calculated feature vectors.

13. A feature extracting device as set forth in claim 10, in which the (n+1)-th stage of feature extraction layer comprises:

an (n+1)-th feature vector calculating module for projecting the n-th feature vectors calculated in the n-th stage of feature extraction layer, after having been normalized, on the (n+1)-th subspace group, and calculating squares of generalized projection length on each subspace, or quantity derived from there as the k-th feature vectors; and an (n+1)-th subspace basis vector learning module including at least an (n+1)-th parameter updating module for updating basis vectors of each subspace forming the (n+1)-th subspace group, so as to increase the ratio of variation between classes to variation within a class as for the final feature vectors, and said subspace basis vector learning module of the respective feature extraction layers include calibrating module for calibrating the feature vectors by performing restraint processing among features based on a restraint parameter predetermined as for the calculated feature vectors.

14. A feature extracting device as set forth in claim 10, in which said parameter updating module performs normalized orthogonalization on the basis vectors obtained by update processing, according to a Gram-Schmid orthogonalization.

15. A feature extracting device as set forth in claim 10, in which said subspace basis vector learning module of the respective feature extraction layers includes a calibrating module for calibrating the feature vectors by performing restraint processing among features based on a restraint parameter predetermined as for the calculated feature vectors, and said parameter updating module performs normalized orthogonalization on the basis vectors obtained by update processing, according to a Gram-Schmid orthogonalization.

16. A feature extracting device as set forth in claim 10, in which the (n+1)-th stage of feature extraction layer comprises:

an (n+1)-th feature vector calculating module for projecting the n-th feature vectors calculated in the n-th stage of feature extraction layer, after having been normalized, on the (n+1)-th subspace group, and calculating squares of generalized projection length on each subspace, or quantity derived from said squares of projection length as the k-th feature vectors; and an (n+1)-th subspace basis vector learning module including at least an (n+1)-th parameter updating module for updating basis vectors of each subspace forming the (n+1)-th subspace group, so as to increase the ratio of variation between classes to variation within a class as for the final feature vectors, said subspace basis vector learning module of the respective feature extraction layers includes a calibrating module for calibrating the feature vectors by performing restraint processing among features based on a restraint parameter predetermined as for the calculated feature vectors, and said parameter updating module performs normalized orthogonalization on the basis vectors obtained by update processing, according to a Gram-Schmid orthogonalization.

17. A feature extracting device as set forth in claim 10, in which said feature vector calculating module of each feature extraction layer normalizes an input to the corresponding layer, projects the same on a subspace group, and calculates squares of projection length on each subspace, or quantity derived from said squares of projection length as feature vectors, and said parameter updating module of each feature extraction layer updates normalized orthogonal basis vectors of each subspace forming the subspace group, so as to increase the ratio of variation between subclasses to variation within a subclass, or the ratio of variation between classes to variation within a class, as for the calculated feature vectors.

18. A feature extracting device as set forth in claim 10, in which said hierarchical subspace basis vector learning unit performs update processing of the basis vectors, or the normalized orthogonal basis vectors increasing the ratio of the variation between classes to the variation within a class, or the ratio of the variation between subclasses to the variation within a subclass, as for the feature vectors, by updating the basis vectors, or the normalized orthogonal basis vectors so as to make the respective components of the feature vectors have no correlation to each other or make the same independent, and simultaneously so as to increase the ratio of the variation between classes to the variation within a class, or the ratio of the variation between subclasses to the variation within a subclass, as for the respective components of the feature vectors.

19. A feature extracting device as set forth in claim 10, in which the (n+1)-th stage of feature extraction layer comprises:

an (n+1)-th feature vector calculating module for projecting the n-th feature vectors calculated in the n-th stage of feature extraction layer, after having been normalized, on the (n+1)-th subspace group, and calculating squares of generalized projection length on each subspace, or quantity derived from there as the k-th feature vectors;

an (n+1)-th subspace vector learning module including at least an (n+1)-th parameter updating module for updating basis vectors of each subspace forming the (n+1)-th subspace group, so as to increase the ratio of variation between classes to variation within a class as for the final feature vectors; and a hierarchical subspace basis vector learning unit that performs update processing of the basis vectors or the normalized orthogonal basis vectors, increasing the ratio of the variation between classes to the variation within a class, or the ratio of the variation between subclasses to the variation within a subclass, as for the feature vectors, by updating the basis vectors or the normalized orthogonal basis vectors, so as to make the respective components of the feature vectors have no correlation to each other or make said components independent, and simultaneously so as to increase the ratio of the variation between classes to the variation within a class, or the ratio of the variation between subclasses to the variation within a subclass, as for the respective components of the feature vectors.

20. A feature extracting device having n (n is an integer more than 1) stages of feature extraction layers and hierarchical subspace basis vector learning modules for updating each parameter for describing operations of the respective feature extraction layers, in which:

a first stage of feature extracting layer comprises:

a first feature vector calculating module for projecting an input pattern, after having been normalized, on a first subspace group, and calculating squares of generalized projection length on each subspace, or quantity derived from there as first feature vectors;

a k-th (k=2 to n) stage of feature extraction layer comprises:

a k-th feature vector calculating module for projecting the (k−1)-th feature vectors calculated in the (k−1)-th stage of feature extraction layer, after having been normalized, on the k-th subspace group, and calculating squares of generalized projection length on each subspace, or quantity derived from said squares of projection length as the k-th feature vectors; and said hierarchical subspace basis vector learning module includes a module for updating the basis vectors of each subspace forming the subspace group of the respective feature extraction layers, so as to increase the ratio of variation between classes to the variation within a class as for the n-th feature vectors that are the final feature vectors calculated in the n-th stage of feature extraction layer.

21. A feature extracting device as set forth in claim 20, in which said hierarchical subspace basis vector learning module updates the normalized orthogonal basis vectors of each subspace forming the subspace group of the respective feature extraction layers, so as to increase the ratio of the variation between classes to the variation within a class as for the final feature vectors.

22. A feature extracting device as set forth in claim 20, in which said subspace basis vector learning module of the respective features extraction layers include a calibrating module for calibrating the feature vectors by performing restraint processing among features based on a restraint parameter predetermined as for the calculated feature vectors.

23. A feature extracting device as set forth in claim 20, in which:
said hierarchical subspace basis vector learning module updates the normalized orthogonal basis vectors of each subspace forming the subspace group of the respective feature extraction layers, so as to increase the ratio of the variation between classes to the variation within a class as for the final feature vectors, and
said subspace basis vector learning module of the respective feature extraction layers include calibrating module for calibrating the feature vectors by performing restraint processing among features based on a restraint parameter predetermined as for the calculated feature vectors.

24. A feature extracting device as set forth in claim 20, in which said parameter updating module performs normalized orthogonalization on the basis vectors obtained by update processing, according to a Gram-Schmid orthogonalization.

25. A feature extracting device as set forth in claim 20, in which:
said hierarchical subspace basis vector learning module updates the normalized orthogonal basis vectors of each subspace forming the subspace group of the respective feature extraction layers, so as to increase the ratio of the variation between classes to the variation within a class as for the final feature vectors, and
said parameter updating module performs normalized orthogonalization on the basis vectors obtained by update processing, according to a Gram-Schmid orthogonalization.

26. A feature extracting device as set forth in claim 20, in which
said hierarchical subspace basis vector learning module updates the normalized orthogonal basis vectors of each subspace forming the subspace group of the respective feature extraction layers, so as to increase the ratio of the variation between classes to the variation within a class as for the final feature vectors,
said subspace basis vector learning module of the respective feature extraction layers includes a calibrating module for calibrating the feature vectors by performing restraint processing among features based on a restraint parameter predetermined as for the calculated feature vectors, and
said parameter updating module performs normalized orthogonalization on the basis vectors obtained by update processing, according to a Gram-Schmid orthogonalization.

27. A feature extracting device as set forth in claim 20, in which said hierarchical subspace basis vector learning unit performs update processing of the basis vectors, or the normalized orthogonal basis vectors increasing the ratio of the variation between classes to the variation within a class, or the ratio of the variation within a class, or the ratio of the variation between subclasses to the variation within a subclass, as for the feature vectors, by updating the basis vectors, or the normalized orthogonal basis vectors so as to make the respective components of the feature vectors have no correlation to each other or make the same independent, and simultaneously so as to increase the ratio of the variation between classes to the variation within a class, or the ratio of the variation between subclasses to the variation within a subclass, as for the respective components of the feature vectors.

28. A feature extracting device as set forth in claim 20, in which
said hierarchical subspace basis vector learning module updates the normalized orthogonal basis vectors of each subspace forming the subspace group of the respective feature extraction layers so as to increase the ratio of the variation between classes to the variation within a class as for the final feature vectors, and
said hierarchical subspace basis vector learning unit performs update processing of the basis vectors, or the normalized orthogonal basis vectors increasing the ratio of the variation between classes to the variation within a class, or the ratio of the variation between subclasses to the variation within a subclass, as for the feature vectors, by updating the basis vectors, or the normalized orthogonal basis vectors so as to make the respective components of the feature vectors have no correlation to each other or make the same independent, and simultaneously so as to increase the ratio of the variation between classes to the variation within a class, or the ratio of the variation between subclasses to the variation within a subclass, as for the respective components of the feature vectors.

29. A feature extracting device as set forth in claim 20, in which:
said subspace basis vector learning module of the respective feature extraction layers include calibrating module for calibrating the feature vectors by performing restraint processing among features based on a restraint parameter predetermined as for the calculated feature vectors, and
said hierarchical subspace basis vector learning unit performs update processing of the basis vectors, or the normalized orthogonal basis vectors increasing the ratio of the variation between classes to the variation within a class, or the ratio of the variation between subclasses to the variation within a subclass, as for the feature vectors, by updating the basis vectors, or the normalized orthogonal basis vectors so as to make the respective components of the feature vectors have no correlation to each other or make the same independent, and simultaneously so as to increase the ratio of the variation between classes to the variation within a class, or the ratio of the variation between subclasses to the variation within a subclass, as for the respective components of the feature vectors.

30. A feature extracting device as set forth in claim 20, in which
said hierarchical subspace basis vector learning module updates the normalized orthogonal basis vectors of each subspace forming the subspace group of the respective feature extraction layers, so as to increase the ratio of the variation between classes to the variation within a class as for the final feature vectors, said subspace basis vector learning module of the respective feature extraction layers includes a calibrating module for calibrating the feature vectors by performing restraint processing among features based on a restraint parameter predetermined as for the calculated feature vectors, and said hierarchical subspace basis vector learning unit performs update processing of the basis vectors, or the normalized orthogonal basis vectors increasing the ratio of the variation between classes to the variation within a class, or the ratio of the variation between subclasses to the variation within a subclass, as for the feature vectors, by updating the basis vectors, or the normalized orthogonal basis vectors so as to make the respective components of the feature vectors have no correlation to each other or make the same independent, and simultaneously so as to increase the ratio of the variation between classes to the variation within a class, or the ratio of the variation between subclasses to the variation within a subclass, as for the respective components of the feature vectors.

31. A pattern learning device for learning relationship between input/output, using a learning data set comprising pairs of an input vector and a desired output vector corresponding to the input vector, said device comprising:

n stages (n is an integer 1 and or more) of processing layers; and a parameter updating module for updating each parameter for describing operations of the respective processing layers, a first stage of processing layer comprising a first output calculating module for projecting an input vector, after having been normalized, on a first subspace group, and calculating squares of generalized projection length on each subspace, or quantity derived from said squares of generalized projection length as first output vectors, the a k-th (k=2 to n) stage of processing layer, when n is 2 and more, comprising a k-th output calculating module for projecting the (k−1)-th output vectors calculated in the (k-1)-th stage of processing layer, after having been normalized, on the k-th subspace group, and calculating squares of generalized projection length on each subspace, or quantity derived from said squares of generalized projection length as the k-th output vectors, and said parameter updating module including a module for updating the basis vectors of each subspace of the respective processing layers, so as to decrease the average square error of the n-th output vectors calculated in the n-th stage of processing layer, that are the final output vectors, and desired output vectors corresponding to the input vector.

32. A computer readable memory storing a feature extraction program for extracting features for pattern recognition, controlling a computer, said feature extraction program performing a method comprising:

projecting a learning pattern to be recognized on a subspace group, so as to calculate squares of projection length on each subspace as feature vectors; and updating basis vectors of each subspace forming the subspace group, so as to increase the ratio of variation between classes to variation within a class, as for each component of the feature vectors.

33. A computer readable memory storing the feature extraction program as set forth in claim 32, the feature extraction program normalizing the learning pattern, to project the same on the subspace group, and calculating squares of generalized projection length on each subspace, as feature vectors, in the feature vector calculation.

34. A computer readable memory storing the feature extraction program as set forth in claim 32, the feature extraction program performing update processing of the basis vectors for increasing the ratio of the variation between classes to the variation within a class as for the feature vectors, by updating the basis vectors so as to make the respective components of the feature vectors have no correlation to each other or make said components independent, and simultaneously so as to increase the ratio of the variation between classes to the variation within a class as for the respective components of the feature vectors.

35. A computer readable memory storing the feature extraction program as set forth in claim 32, the feature extraction program normalizing the learning pattern, to project the same on the subspace group, and calculating squares of generalized projection length on each subspace, as feature vectors, in the feature vector calculation, and performing update processing of the basis vectors for increasing the ratio of the variation between classes to the variation within a class as for the feature vectors, by updating the basis vectors so as to make the respective components of the feature vectors have no correlation to each other or make said components independent, and simultaneously so as to increase the ratio of the variation between classes to the variation within a class as for the respective components of the feature vectors.

36. A computer readable memory storing a feature extraction program for deciding features, using data set, as learning data, consisting of input patterns, class names C the patterns belong to, and a series of subclass names $C_m$ (m=1 to n, where n is an integer 1 and more, assuming that the subclasses are hierarchically classified finer according as m becomes larger), the feature extraction program comprising:

(n+1) stages of feature extraction layers, a first stage of feature extracting layer comprising:

a first feature vector calculating module for projecting an input learning pattern, after having been normalized, on a first subspace group, and calculating squares of generalized projection length on each subspace, or quantity derived from said squares of generalized projection length as first feature vectors; and a first subspace basis vector learning module including at least a first parameter updating module for updating basis vectors of each subspace forming the first subspace group, so as to increase the ratio of variation between subclasses to variation within a subclass as for the n-th subclass, including the most segmented subclass, with respect to the first feature vectors, the k-th (k=2 to n) stage of feature extraction layer comprising:

a k-th feature vector calculating module for projecting the (k−1)-th feature vectors calculated in the (k−1)-th stage of feature extraction layer, after having been normalized, on the k-th subspace group, and calculating squares of generalized projection length on each subspace, or quantity derived from said squares of generalized projection length as the k-th feature vectors, and a k-th subspace basis vector learning module including at least a k-th parameter updating module for updating basis vectors of each subspace forming the k-th subspace group, so as to increase the ratio (variation between subclasses/variation within a subclass) as for the (n+1-k)-th subclass, with respect to the k-th feature vectors.

37. A computer readable memory storing the feature extraction program as set forth in claim 36, in which the (n+1)-th stage of feature extraction layer comprises:

an (n+1)-th feature vector calculating module for projecting the n-th feature vectors calculated in the n-th stage of feature extraction layer, after having been normalized, on the (n+1)-th subspace group, and calculating squares of generalized projection length on each subspace, or quantity derived from there as the k-th feature vectors, and an (n+1)-th parameter updating module for updating basis vectors of each subspace forming the (n+1)-th subspace group, so as to increase the ratio of variation between classes to variation within a class as for the final feature vectors.

38. A computer readable memory storing a feature extraction program for realizing n (n is an integer more than 1) stages of feature extraction layers and a hierarchical subspace basis vector learning function for updating each parameter for describing operations of the respective feature extraction layers, the feature extraction program comprising:

in a first stage of feature extracting layer, a first feature vector calculating module for projecting an input pattern, after having been normalized on a first subspace group, and calculating squares of generalized projection length on each subspace, or quantity derived therefrom as first feature vectors; and in the each of a k-th (k=2 to n) stage of feature extraction layer, a k-th feature vector calculating module for projecting the (k−1)-th feature vectors calculated in the (k-1)-th stage of feature extraction layer, after having been normalized, on the k-th subspace group, and calculating squares of generalized projection length on each subspace, or quantity derived from there as the k-th feature vectors, and said hierarchical subspace basis vector learning function updating the basis vectors of each subspace forming the subspace groups of the respective feature extraction layers, so as to increase the ratio of the variation between classes to the variation within a class as for the n-th feature vectors that are the final feature vectors calculated in the n-th stage of feature extraction layer.

* * * * *